United States Patent [19]
Dove et al.

[11] Patent Number: 6,078,320
[45] Date of Patent: Jun. 20, 2000

[54] SYSTEM FOR CONFIGURING A PROCESS CONTROL ENVIRONMENT

[75] Inventors: Andrew P. Dove, Austin; Larry O. Jundt, Round Rock; Stephen G. Hammack, Austin; J. Clint Fletcher, Pflugerville, all of Tex.

[73] Assignee: Fisher-Rosemount Systems, Inc., Austin, Tex.

[21] Appl. No.: 09/025,202

[22] Filed: Feb. 18, 1998

Related U.S. Application Data

[63] Continuation of application No. 08/631,863, Apr. 12, 1996, Pat. No. 5,838,563.

[51] Int. Cl.[7] ................................................ G06F 15/00
[52] U.S. Cl. ...................... 345/333; 345/965; 345/967; 700/83
[58] Field of Search ..................................... 345/333, 335, 345/326, 339, 348, 356, 965, 967; 364/188; 395/701; 700/83, 86, 17

[56] References Cited

U.S. PATENT DOCUMENTS

| | | | |
|---|---|---|---|
| Re. 33,162 | 2/1990 | Yoshida et al. | 700/291 |
| 3,665,172 | 5/1972 | Spaargaren et al. | 700/75 |
| 4,006,464 | 2/1977 | Landell | 700/83 |
| 4,302,820 | 11/1981 | Struger et al. | 712/248 |
| 4,413,314 | 11/1983 | Slater et al. | 700/83 |
| 4,443,861 | 4/1984 | Slater | 710/8 |
| 4,639,852 | 1/1987 | Motomiya | 700/9 |
| 4,641,269 | 2/1987 | Japenga et al. | 700/158 |
| 4,663,704 | 5/1987 | Jones et al. | 700/83 |
| 4,672,530 | 6/1987 | Schuss | 700/4 |

(List continued on next page.)

FOREIGN PATENT DOCUMENTS

WO 95/04314   2/1995   WIPO .

OTHER PUBLICATIONS

H.J. Beestermöller et al., "An online and offline programmable Multiple–Loop Controller for Distributed Systems", © 1994 IEEE, pp. 15–20.

Robert R. Lyons, "New Telemecanique Programmable Controllers Feature Multiple Programming Languages", Telemacanique, Arlington Heights, IL, Feb. 11, 1995.

Clifford J. Peshek et al., "Recent Developments and Future Trends in PLC Programming Languages and Programming Tools for Real–Time Control", IEEE Cement Industry Technical Conference, May 1993, Toronto, Canada, pp. 219–230.

C.K. Duffey et al., "High–Level Control Language Customizes Application Programs", Power Technologies, Inc., IEEE Computer Applications in Power, © Apr. 1991, pp. 15–18.

John R. Gyorki, "PLC's drive standard buses", Machine Designs, May 11, 1995, pp. 83–90.

Moore Products Co., "Control System", POWER Apr. 1995, p. 11'4, vol. 139, No. 4, Copyright 1995, McGraw–Hill, Inc.

Moore Products Co., "Apacs Control System ", POWER Jun., 1995, p. 81, vol. 139, No. 6, Copyright 1995, McGraw–Hill, Inc.

*Primary Examiner*—Crescelle N. dela Torre
*Attorney, Agent, or Firm*—Marshall, O'Toole, Gerstein, Murray & Borun

[57] ABSTRACT

A control studio object system is disclosed which allows a process control environment to be easily and quickly configured or modified. The control studio object system includes a stencil portion having stencil items conforming to algorithms and a diagram portion to which the stencil items may be copied via a drag and drop operation. Because the stencil items are objects which contain all of the information required by a diagram portion to create an object that contains all of the information necessary to program the process control environment, the completed diagram portion reflects the actual configuration of the process control environment. Additionally, providing the stencil items as objects allows the diagrammed environment to be installed directly to nodes without requiring the diagram to be compiled or rewritten in a language conforming to the node.

68 Claims, 28 Drawing Sheets

U.S. PATENT DOCUMENTS

| | | | |
|---|---|---|---|
| 4,682,158 | 7/1987 | Ito et al. | 340/679 |
| 4,704,676 | 11/1987 | Flanagan et al. | 700/17 |
| 5,121,318 | 6/1992 | Lipner et al. | 700/17 |
| 5,124,908 | 6/1992 | Broadbent | 700/83 |
| 5,129,087 | 7/1992 | Will | 395/704 |
| 5,140,677 | 8/1992 | Fleming et al. | 345/348 |
| 5,164,894 | 11/1992 | Cunningham-Reid et al. | 700/2 |
| 5,168,441 | 12/1992 | Onarheim et al. | 700/17 |
| 5,202,961 | 4/1993 | Mills et al. | 345/348 |
| 5,251,125 | 10/1993 | Karnowski et al. | 700/84 |
| 5,307,346 | 4/1994 | Fieldhouse | 370/254 |
| 5,309,556 | 5/1994 | Sismilich | 345/349 |
| 5,371,895 | 12/1994 | Bristol | 395/705 |
| 5,377,315 | 12/1994 | Leggett | 345/440 |
| 5,384,910 | 1/1995 | Torres | 345/352 |
| 5,392,389 | 2/1995 | Fleming | 345/349 |
| 5,394,522 | 2/1995 | Sanchez-Frank et al. | 345/349 |
| 5,408,603 | 4/1995 | Van de Lavoir et al. | 345/349 |
| 5,420,977 | 5/1995 | Sztipanovits et al. | 345/356 |
| 5,426,732 | 6/1995 | Boies et al. | 345/349 |
| 5,428,734 | 6/1995 | Haynes et al. | 345/349 |
| 5,432,711 | 7/1995 | Jackson et al. | 340/825.03 |
| 5,437,007 | 7/1995 | Bailey et al. | 345/349 |
| 5,444,851 | 8/1995 | Woest | 709/222 |
| 5,452,201 | 9/1995 | Pieronek et al. | 700/83 |
| 5,459,825 | 10/1995 | Anderson et al. | 345/433 |
| 5,461,710 | 10/1995 | Bloomfield et al. | 345/349 |
| 5,467,264 | 11/1995 | Rauch et al. | 700/12 |
| 5,475,856 | 12/1995 | Kogge | 712/20 |
| 5,481,741 | 1/1996 | McKaskle et al. | 345/522 |
| 5,485,620 | 1/1996 | Sadre et al. | 395/710 |
| 5,491,791 | 2/1996 | Glowny et al. | 714/37 |
| 5,500,934 | 3/1996 | Austin et al. | 345/326 |
| 5,504,672 | 4/1996 | Hardiman et al. | 700/45 |
| 5,504,902 | 4/1996 | McGrath et al. | 395/707 |
| 5,513,095 | 4/1996 | Pajonk | 700/2 |
| 5,519,605 | 5/1996 | Cawlfield | 700/31 |
| 5,530,643 | 6/1996 | Hodorowski | 700/86 |
| 5,549,137 | 8/1996 | Lenz et al. | 137/486 |
| 5,550,980 | 8/1996 | Pascucci et al. | 359/111 |
| 5,559,691 | 9/1996 | Monta et al. | 700/83 |
| 5,566,320 | 10/1996 | Hubert | 711/147 |
| 5,576,946 | 11/1996 | Bender et al. | 700/17 |
| 5,594,858 | 1/1997 | Blevins | 345/326 |
| 5,621,871 | 4/1997 | Jaremko et al. | 345/441 |
| 5,838,563 | 11/1998 | Dove et al. | 700/83 |
| 5,920,479 | 7/1999 | Sojoodi et al. | 700/86 |

SYSTEM FOR CONFIGURING A PROCESS CONTROL ENVIRONMENT

This is a continuation of application Ser. No. 08/631,863, now U.S. Pat. No. 5,838,563 entitled "System For Configuring A Process Control Environment," filed Apr. 12, 1996, with inventors Dove, Andrew P.; Jundt, Larry O.; Hammack, Stephen G.; and Fletcher, Clint, and is assigned to Fisher-Rosemount Systems Inc., all of which is hereby incorporated by reference in its entirety.

CROSS-REFERENCE TO RELATED APPLICATIONS

This application is related to copending application by Nixon et al., entitled "A Process Control System Using Standard Protocol Control of Standard Devices and Non-standard Devices", filed on even date herewith (U.S. Pat. No. 5,828,851), which application is hereby incorporated by reference in its entirety, including any appendices and references thereto.

This application is related to copending application by Nixon et al., entitled "A Process Control System for Versatile Control of Multiple Process Devices of Various Device Types", filed on even date herewith (U.S. patent application Ser. No. 08/631,521), which application is hereby incorporated by reference in its entirety, including any appendices and references thereto.

This application is related to copending application by Nixon et al., entitled "Process Control System for Monitoring and Displaying Diagnostic Information of Multiple Distributed Devices", filed on even date herewith (U.S. patent application Ser. No. 08/631,557), which application is hereby incorporated by reference in its entirety, including any appendices and references thereto.

This application is related to copending application by Nixon et al., entitled "Process Control System Including Automatic Sensing and Automatic Configuration of Devices", filed on even date herewith (U.S. patent appliction Ser. No. 08/631,519), which application is hereby incorporated by reference in its entirety, including any appendices and references thereto.

This application is related to copending application by Nixon et al., entitled "A Process Control System User Interface Including Selection of Multiple: Control Languages", filed on even date herewith (U.S. Pat. No. 5,801,942), which application is hereby incorporated by reference in its entirety, including any appendices and references thereto.

This application is related to copending application by Dove, entitled "System for Assisting Configuring a Process Control Environment", filed on even date herewith (U.S. Pat. No. 5,940,294),which application is hereby incorporated by reference in its entirety, including any appendices and references thereto.

This application is related to copending application by Nixon et al., entitled "Process Control System Using a Control Strategy Implemented in a Layered Hierarchy of Control Modules", filed on even date herewith (U.S. Pat. No. 5,863,052), which application is hereby incorporated by reference in its entirety, including any appendices and references thereto.

This application is related to copending application by Nixon et al., entitled "A Process Control System Using a Process Control Strategy Distributed Among Multiple Control Elements", filed on even date herewith (U.S. Pat. No. 5,909,368), which application is hereby incorporated by reference in its entirety, including any appendices and references thereto.

This application is related to copending application by Nixon et al., entitled "Improved Process System", filed on even date herewith (U.S. Provisional Patent application No. 60/017,700), which application is hereby incorporated by reference in its entirety, including any appendices and references thereto.

BACKGROUND OF THE INVENTION

1. Field of the Invention

This invention relates to process monitoring and control systems. More specifically, the present invention relates to a system for creating a control template of a plurality of control templates, an individual control template having associated attributes, methods, and graphical views that are selected by a user to generate design process control solutions.

2. Description of the Related Art

Present-day process control systems use instruments, control devices and communication systems to monitor and manipulate control elements, such as valves and switches, to maintain at selected target values one or more process variables, including temperature, pressure, flow and the like. The process variables are selected and controlled to achieve a desired process objective, such as attaining the safe and efficient operation of machines and equipment utilized in the process. Process control systems have widespread application in the automation of industrial processes such as the processes used in chemical, petroleum, and manufacturing industries, for example.

Control of the process is often implemented using microprocessor-based controllers, computers or workstations which monitor the process by sending and receiving commands and data to hardware devices to control either a particular aspect of the process or the entire process as a whole. The specific process control functions that are implemented by software programs in these microprocessors, computers or workstations may be individually designed, modified or changed through programming while requiring no modifications to the hardware. For example, an engineer might cause a program to be written to have the controller read a fluid level from a level sensor in a tank, compare the tank level with a predetermined desired level, and then open or close a feed valve based on whether the read level was lower or higher than the predetermined, desired level. The parameters are easily changed by displaying a selected view of the process and then by modifying the program using the selected view. The engineer typically would change parameters by displaying and modifying an engineer's view of the process.

In addition to executing control processes, software programs also monitor and display a view of the processes, providing feedback in the form of an operator's display or view regarding the status of particular processes. The monitoring software programs also signal an alarm when a problem occurs. Some programs display instructions or suggestions to an operator when a problem occurs. The operator who is responsible for the control process needs to view the process from his point of view. A display or console is typically provided as the interface between the microprocessor based controller or computer performing the process control function and the operator and also between the programmer or engineer and the microprocessor based controller or computer performing the process control function.

Systems that perform, monitor, control, and feedback functions in process control environments are typically implemented by software written in high-level computer programming languages such as Basic, Fortran or C and executed on a computer or controller. These high-level languages, although effective for process control programming, are not usually used or understood by process engineers, maintenance engineers, control engineers, operators and supervisors. Higher level graphical display languages have been developed for such personnel, such as continuous function block and ladder logic. Thus, each of the engineers, maintenance personnel, operators, lab personnel and the like, require a graphical view of the elements of the process control system that enables them to view the system in terms relevant to their responsibilities.

For example, a process control program might be written in Fortran and require two inputs, calculate the average of the inputs and produce an output value equal to the average of the two inputs. This program could be termed the AVERAGE function and may be invoked and referenced through a graphical display for the control engineers. A typical graphical display may consist of a rectangular block having two inputs, one output, and a label designating the block as AVERAGE. A different program may be used to create a graphical representation of this same function for an operator to view the average value. Before the system is delivered to the customer, these software programs are placed into a library of predefined user selectable features. The programs are identified by function blocks. A user may then invoke a function and select the predefined graphical representations to create different views for the operator, engineer, etc. by selecting one of a plurality of function blocks from the library for use in defining a process control solution rather than having to develop a completely new program in Fortran, for example.

A group of standardized functions, each designated by an associated function block, may be stored in a control library. A designer equipped with such a library can design process control solutions by interconnecting, on a computer display screen, various functions or elements selected with the function blocks to perform particular tasks. The microprocessor or computer associates each of the functions or elements defined by the function blocks with predefined templates stored in the library and relates each of the program functions or elements to each other according to the interconnections desired by the designer. Ideally, a designer could design an entire process control program using graphical views of predefined functions without ever writing one line of code in Fortran or other high-level programming language.

One problem associated with the use of graphical views for process control programming is that existing systems allow only the equipment manufacturer, not a user of this equipment, to create his own control functions, along with associated graphical views, or modify the predefined functions within the provided library.

New process control functions are designed primarily by companies who sell design systems and not by the end users who may have a particular need for a function that is not a part of the standard set of functions supplied by the company. The standardized functions are contained within a control library furnished with the system to the end user. The end user must either utilize existing functions supplied with the design environment or rely on the company supplying the design environment to develop any desired particular customized function for them. If the designer is asked to modify the parameters of the engineer's view, then all other views using those parameters have to be rewritten and modified accordingly because the function program and view programs are often developed independently and are not part of an integrated development environment. Clearly, such procedure is very cumbersome, expensive, and time-consuming.

What is needed is a uniform or universal design environment that can easily be used, not only by a designer or manufacturer but also a user, to customize an existing solution to meet his specific needs for developing process control functions.

SUMMARY OF THE INVENTION

It has been discovered that a process control environment may be easily and quickly configured or modified by providing a control studio object system which includes a stencil portion (which is also referred to as a palette portion) having stencil items conforming to algorithms and a diagram portion to which the stencil items may be copied via a drag and drop operation. Because the stencil items are objects which contain all of the information required by a diagram portion to create an object that contains all of the information necessary to program the process control environment, the completed diagram portion reflects the actual configuration of the process control environment. It has also been discovered that providing the stencil items as objects allows the diagrammed environment to be installed directly to nodes without requiring the diagram to be compiled or rewritten in a language conforming to the node.

In one aspect, the invention relates to a method for configuring a process control environment, the process control environment including a computer system having a processor coupled to a display device. The method includes the steps of: presenting, on the display device, a stencil view including a module object, the module object representing a process control module; presenting, on the display device, a process control environment view, the process control environment view representing the process control environment configuration; dragging the module object from the stencil view to the process control environment view; dropping the module object on the process control environment view in a position indicative of a location of the process control module in the process control environment, and, configuring the process control environment in accordance with the process control environment view.

The described design environment enables a process control designer or user to modify a standard process control function or create a unique customized process control function and create the graphical views to be associated with the modified or newly created process control function, all within a common environment. The design environment includes a common interface for both the creation of the function and for its associated engineers, operators, lab and maintenance personnel or other desired users such that when the engineer's function is modified or created, the modification or creation manifests itself in all other graphical views of the function. In addition, the design environment has a common database structure of attributes and methods and the graphics associated with the process control-function to allow modified or created process control functions to be represented in whatever graphical methodology that is desired or required by the designer, whether by ladder logic, continuous function block or other design languages required by the various engineer, operator, lab, and maintenance personnel as other desired graphical views.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE PREFERRED EMBODIMENTS

Figure 1:
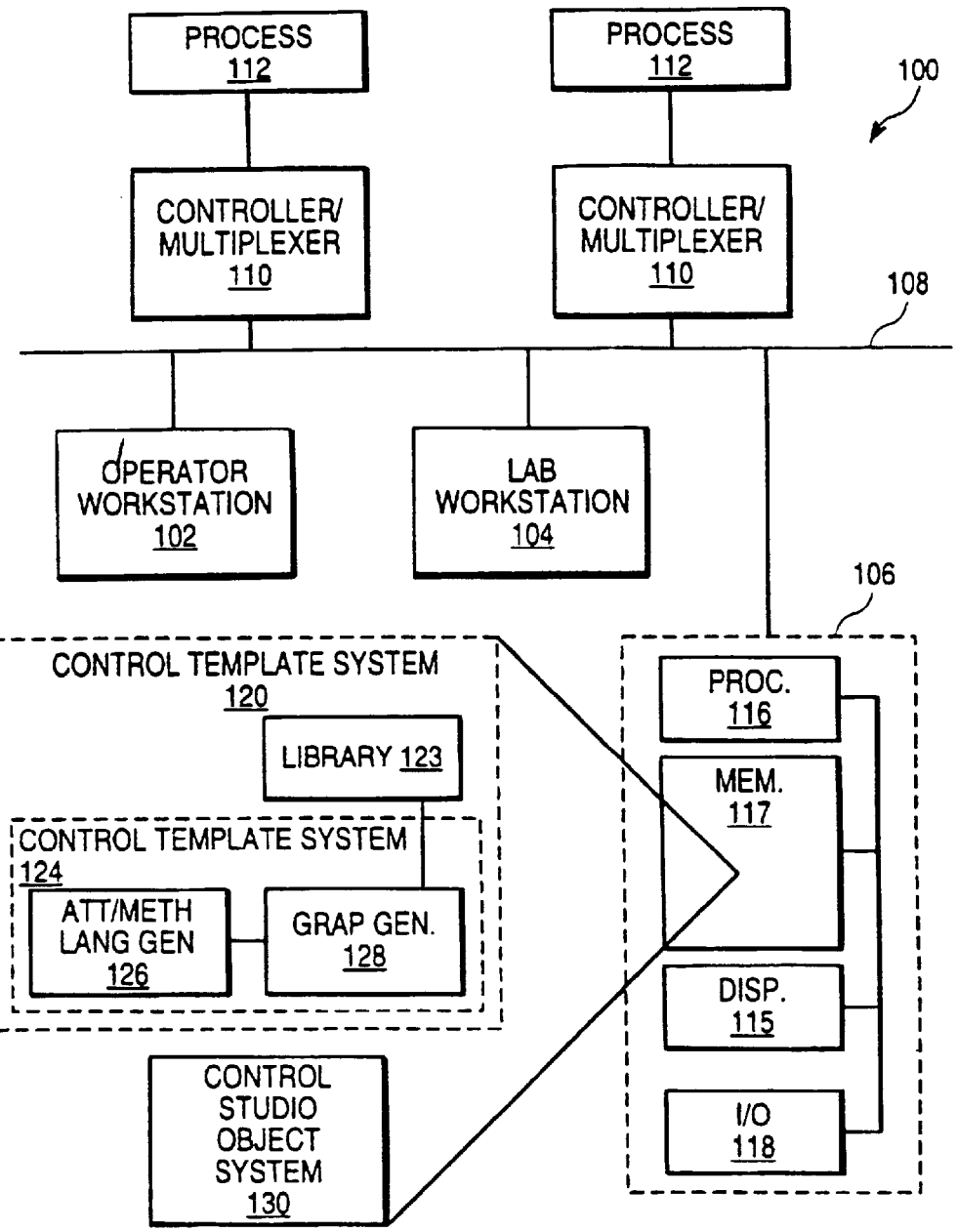
FIG. 1 is a schematic block diagram showing a workstation in accordance with a generalized embodiment of the present invention which furnishes a capability to create a new control template and a capability to modify an existing control.

A process control environment 100 is shown in FIG. 1 and illustrates a control environment for implementing a digital control system, process controller or the like. The process control environment 100 includes an operator workstation 102 and an engineering workstation 106 electrically interconnected by a local area network ("LAN") 108, or other known communication link, for transferring and receiving data and control signals among the various workstations and a plurality of controller/multiplexers 110. Workstations 102 and 106 are, for example, computers which conform to the IBM compatible architecture. The workstations 102 and 106 are shown connected by the LAN 108 to a plurality of the controller/multiplexers 110 that electrically interface between the workstations and a plurality of processes 112. In multiple various embodiments, the LAN 108 includes a single workstation connected directly to a controller/multiplexer 110 or alternatively includes a plurality of workstations, for example two workstations 102 and 106, and many controller/multiplexers 110 depending upon the purposes and requirements of the process control environment 100. In some embodiments, a single process controller/multiplexer 110 controls several different processes 112 or alternatively controls a portion of a single process.

In the process control environment 100, a process control strategy is developed by creating a software control solution on the engineering workstation 106, for example, and transferring the solution via the LAN 108 to the operator workstation 102, lab workstation 104, and to controller/multiplexer 110 for execution. The operator workstation 102 supplies interface displays to the control/monitor strategy implemented in the controller/multiplexer 110 and communicates to one or more of the controller/multiplexers 110 to view the processes 112 and change control attribute values according to the requirements of the designed solution. The processes 112 are formed from one or more field devices, which may be smart field devices or conventional (non-smart) field devices.

In addition, the operator workstation 102 communicates visual and audio feedback to the operator regarding the status and conditions of the controlled processes 112. The engineering workstation 106 includes a processor 116, and a display 115 and one or more input/output or user-interface device 1 18 such as a keyboard, light pen and the like. The workstation also includes a memory 117, which includes both volatile and non-volatile memory. The memory 117 includes a control program that executes on the processor 116 to implement control operations and functions of the process control environment 100. The memory 117 also includes a control template system 120 and a Control Studio Object system 130. The operator workstation 102, and other workstations (not shown) within the process control environment 100 include at least one central processing unit (not shown) which is electrically connected to a display (not shown) and a user-interface device (not shown) to allow interaction between a user and the processor.

The process control environment 100 also includes a template generator 124 and a control template library 123 which, in combination, form the control template system 120. A control template is defined as the grouping of attribute functions that are used to control a process and the methodology used for a particular process control function, the control attributes, variables, inputs, and outputs for the particular function and the graphical views of the function as needed such as an engineer view and an operator view.

The control template system 120 includes the control template library 123 that communicates with the template generator 124. The control template library 123 contains data representing sets of predefined or existing control template functions for use in process control programs. The control template functions are the templates that generally come with the system from the system designer to the user. The template generator 124 is an interface that advantageously allows a user to create new control template functions or modify existing control template functions. The created and modified template functions are selectively stored in the control template library 123.

The template generator 124 includes an attributes and methods language generator 126 and a graphics generator

128. The attributes and methods language generator 126 supplies display screens that allow the user to define a plurality of attribute functions associated with the creation of a new control template function or modification of a particular existing control template function, such as inputs, outputs, and other attributes, as well as providing display screens for enabling the user to select methods or programs that perform the new or modified function for the particular control template. The graphics generator 128 furnishes a user capability to design graphical views to be associated with particular control templates. A user utilizes the data stored by the attributes and methods language generator 126 and the graphics generator 128 to completely define the attributes, methods, and graphical views for a control template. The data representing the created control template function is generally stored in the control template library 123 and is subsequently available for selection and usage by an engineer for the design of process control solutions.

Control Studio Object system 130 provides a user friendly interface which allows a user to create, modify, use, and delete basic building blocks of a diagram, called stencil items, palette items or templates. Control Studio Object system 130 is understandable by a user who has no previous experience in manipulating the basic building blocks of template generator. Control Studio Object system 130, and specifically the stencil portion of the control studio object system 130, interacts with template generator 120.

Figure 2:
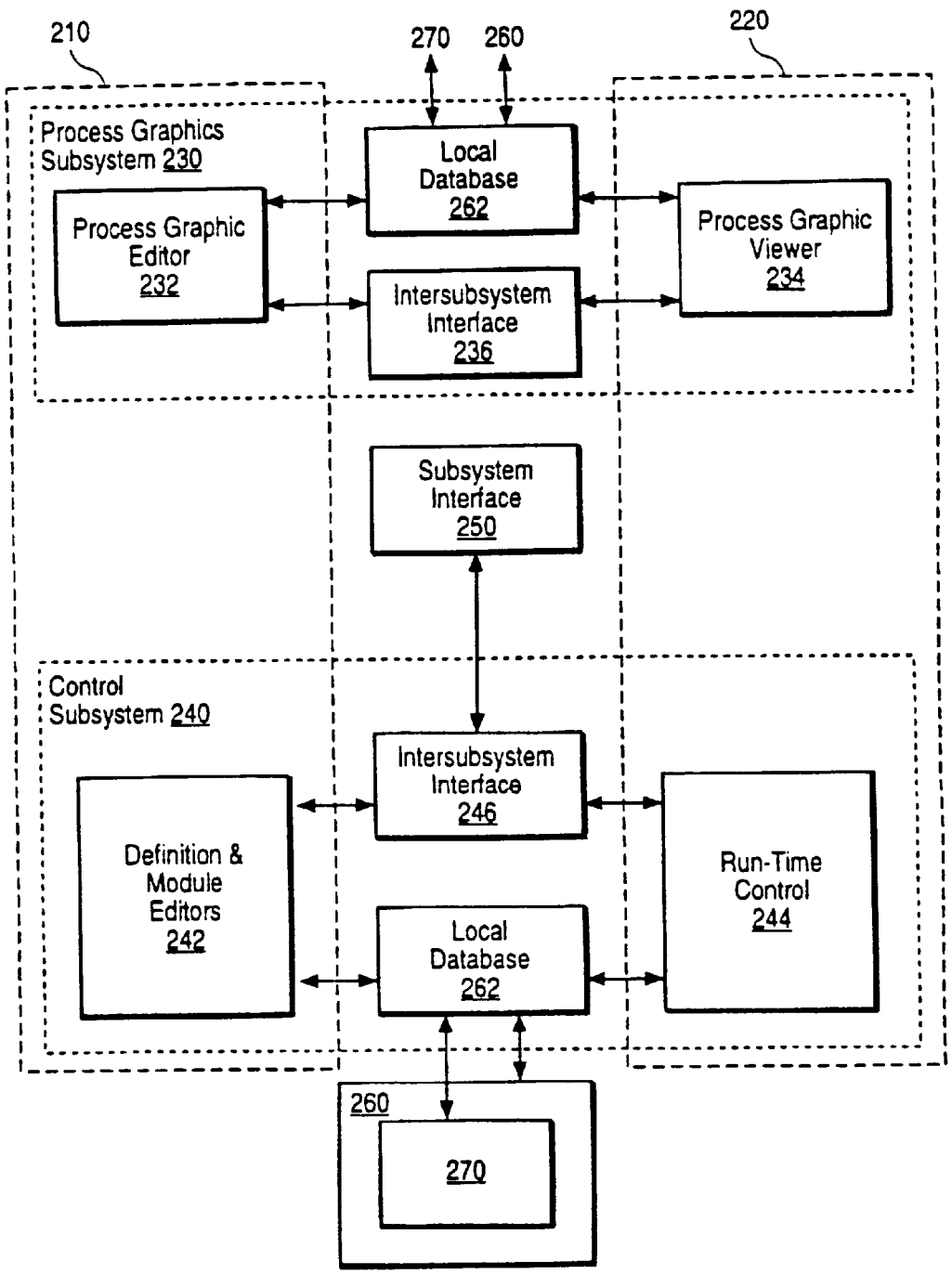
FIG. 2 is a schematic block diagram showing the process control environment in a configuration implementation and a run-time implementation.

The process control environment 100 exists in a configuration model or configuration implementation 210 and a run-time model or run-time implementation 220 shown in FIG. 2. In the configuration implementation 210, the component devices, objects, interconnections and interrelationships within the process control environment 100 are defined. In the run-time implementation 220, ovarious component various component devices, objects, interconnections and interrelationships are performed. The configuration implementation 210 and the run-time implementation 220 are interconnected through a ASCII based download language The download language creates system objects according to definitions supplied by a user and creates instances (discussed in detail below) from the supplied definitions. In addition to downloading definitions, the download language also uploads instances and instance values. The configuration implementation 210 is activated to execute in the run-time implementation 220 using an installation procedure.

The process control environment 100 includes multiple subsystems with several of the subsystems having both a configuration and a run-time implementation. For example, a process graphic subsystem 230 supplies user-defined views and operator interfacing to the architecture of the process control environment 100. The process graphic subsystem 230 has a process graphic editor 232, a part of the configuration implementation 210, a process graphic viewer 234, and a portion of the run-time implementation 220. The process graphic editor 232 is connected to the process graphic viewer 234 by an intersubsystem interface 236 in the download language. The process control environment 100 also includes a control subsystem 240 which configures and installs control modules and equipment modules in a definition and module editor 242 and which executes the control modules and the equipment modules in a run-time controller 244. The definition and module editor 242 operates within the configuration implementation 210 and the run-time controller 244 operates within the run-time implementation 220 to supply continuous and sequencing control functions. The definition and module editor 242 is connected to the run-time controller 244 by an intersubsystem interface 246 in the download language. The multiple subsystems are interconnected by a subsystem interface 250.

The configuration implementation 210 and the run-time implementation 220 interface to a master database 260 to support access to common data structures. Various local (non-master) databases 262 interface to the master database 260, for example, to transfer configuration data from the master database 260 to the local databases 262 as directed by a user. Part of the master database 260 is a persistent database 270. The persistent database 270 is an object which transcends time so that the database continues to exist after the creator of the database no longer exists and transcends space so that the database is removable to an address space that is different from the address space at which the database was created. The entire configuration implementation 210 is stored in the persistent database 270.

The run-time implementation 220 interfaces to the persistent database 270 and to local databases 262 to access data structures formed by the configuration implementation 210. In particular, the run-time implementation 220 fetches selected equipment modules, displays and the like from the local databases 262 and the persistent database 270. The run-time implementation 220 interfaces to other subsystems to install definitions, thereby installing objects that are used to create instances, when the definitions do not yet exist, instantiating run-time instances, and transferring information from various source to destination objects.

Figure 3:
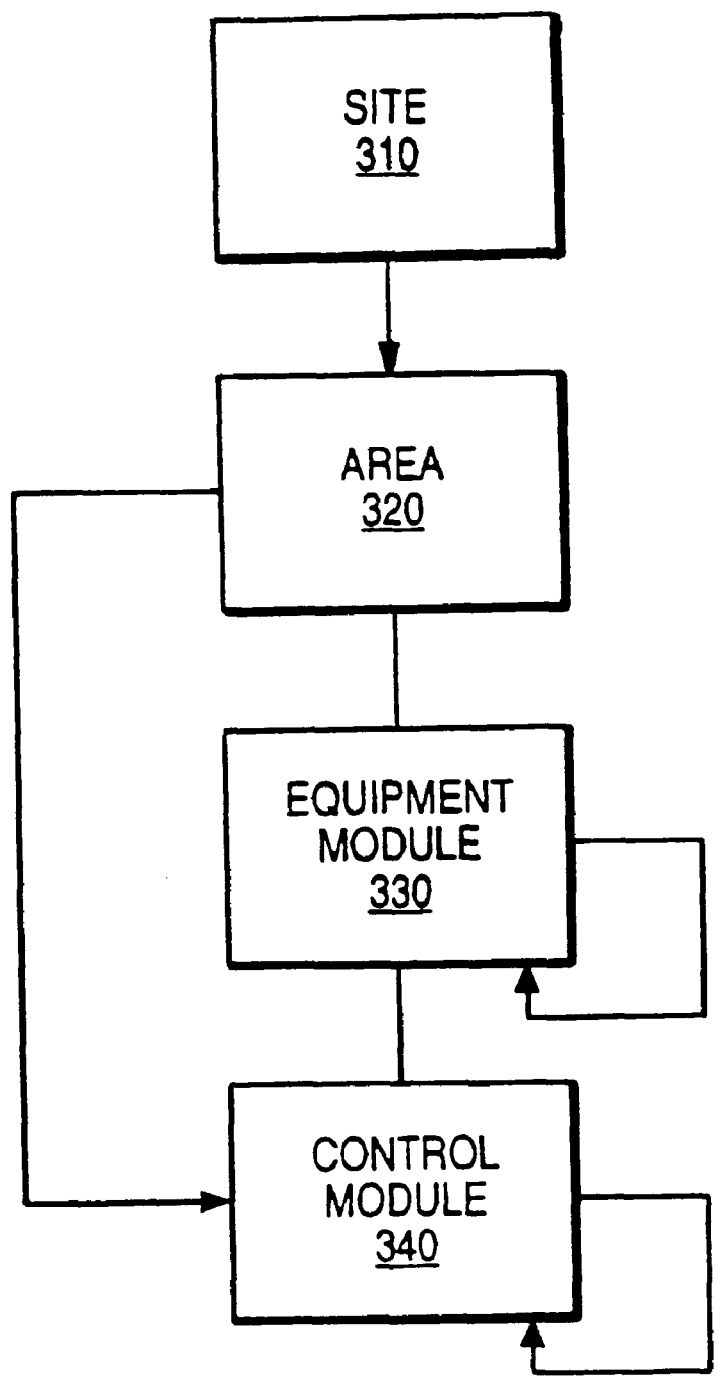
FIG. 3 is a schematic block diagram which depicts a hierarchical relationship among system objects of a configuration model in accordance with an embodiment of the present invention.

Referring to FIG. 3, a schematic block diagram illustrates a hierarchical relationship among system objects of a configuration model 300. The configuration model 300 includes many configuration aspects including control, I/O, process graphics, process equipment, alarms, history and events. The configuration model 300 also includes a device description and network topology layout.

The configuration model hierarchy 300 is defined for usage by a particular set of users for visualizing system object relationships and locations and for communicating or navigating maintenance information among various system objects. For example, one configuration model hierarchy 300, specifically a physical plant hierarchy, is defined for usage by maintenance engineers and technicians for visualizing physical plant relationships and locations and for communicating or navigating maintenance information among various instruments and equipment in a physical plant. An embodiment of a configuration model hierarchy 300 that forms a physical plant hierarchy supports a subset of the SP88 physical equipment standard hierarchy and includes a configuration model site 310, one or more physical plant areas 320, equipment modules 330 and control modules 340.

The configuration model hierarchy 300 is defined for a single process site 310 which is divided into one or more named physical plant areas 320 that are defined within the configuration model hierarchy 300. The physical plant areas 320 optionally contain tagged modules, each of which is uniquely instantiated within the configuration model hierarchy 300. A physical plant area 320 optionally contains one or more equipment modules 330. An equipment module 330 optionally contains other equipment modules 330, control modules 340 and function blocks. An equipment module 330 includes and is controlled by a control template that is created according to one of a number of different graphical process control programming languages including continuous function block, ladder logic, or sequential function charting ("SFC"). The configuration model hierarchy 300 optionally contains one or more control modules 340. A control module 340 is contained in an object such as a physical plant area 320, an equipment module 330 or another control module 340. A control module 340 optionally contains objects such as other control modules 340 or function blocks.

The Control Studio object system 130 enables a user to add objects to diagrams, drag and drop objects between diagrams and third party applications, cut and paste objects between diagrams and other applications and install process control environments depicted by the diagrams having the objects to the process control environment.

User Interface Aspects of Control Studio Object System

Figure 4:
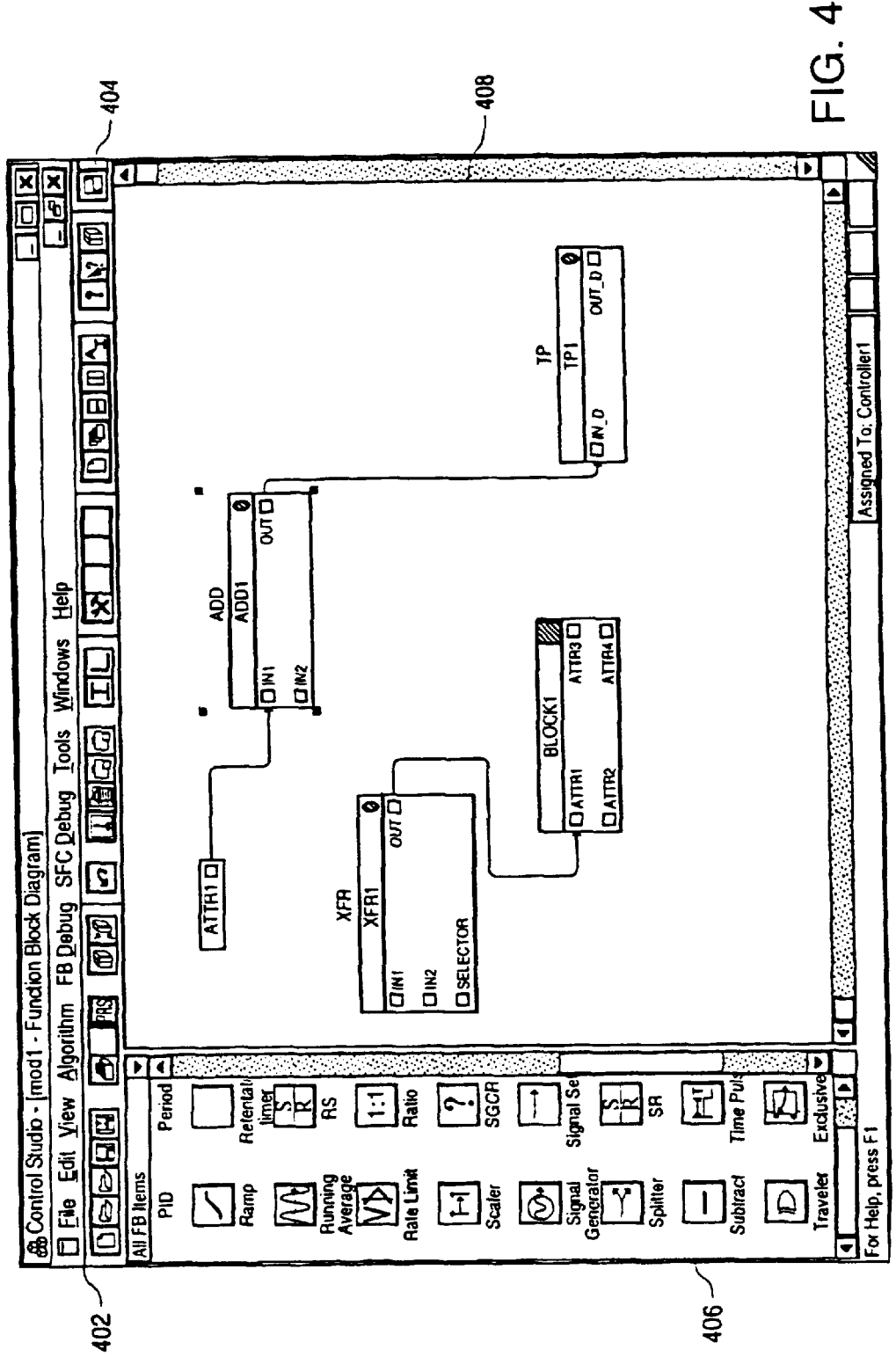
FIG. 4 is a screen presentation of a Control Studio Object system in accordance with an embodiment of the present invention.

Referring to FIG. 4, the main control window of the control studio object system 130 includes textual pull down menus 402, pictographic menu 404, a stencil portion presentation 406 and a diagram portion screen presentation 408. Stencil items 420 are displayed within the stencil portion presentation 406. The user's diagram of the process control environment design is presented in the diagram-portion screen presentation. This diagram of the process control design environment is referred to as the process control environment view. Each of the presentations in the main window is re-sizable and relocatable by the user in accordance with known windowing techniques. The control studio object system 130 tracks the location and size of the panes of the main window by maintaining persistent object data including coordinates within the two-dimensional display, as well as style and other information.

When designing a process control environment, a user simply actuates a stencil item from the stencil portion presentation 406, drags the actuated stencil item to a desired location within the diagram portion screen presentation 408 and drops the actuated stencil item in a desired location. Control studio object system 130 then creates a diagram item that allows the diagram to create an object with all of the information necessary for configuring a process control environment. Because the stencil items are objects which include all of the necessary information for the diagram to configure a process control environment, when the process control environment design is completed within the diagram portion, this design may be directly downloaded to the appropriate portions of the process control environment.

Figure 5A:
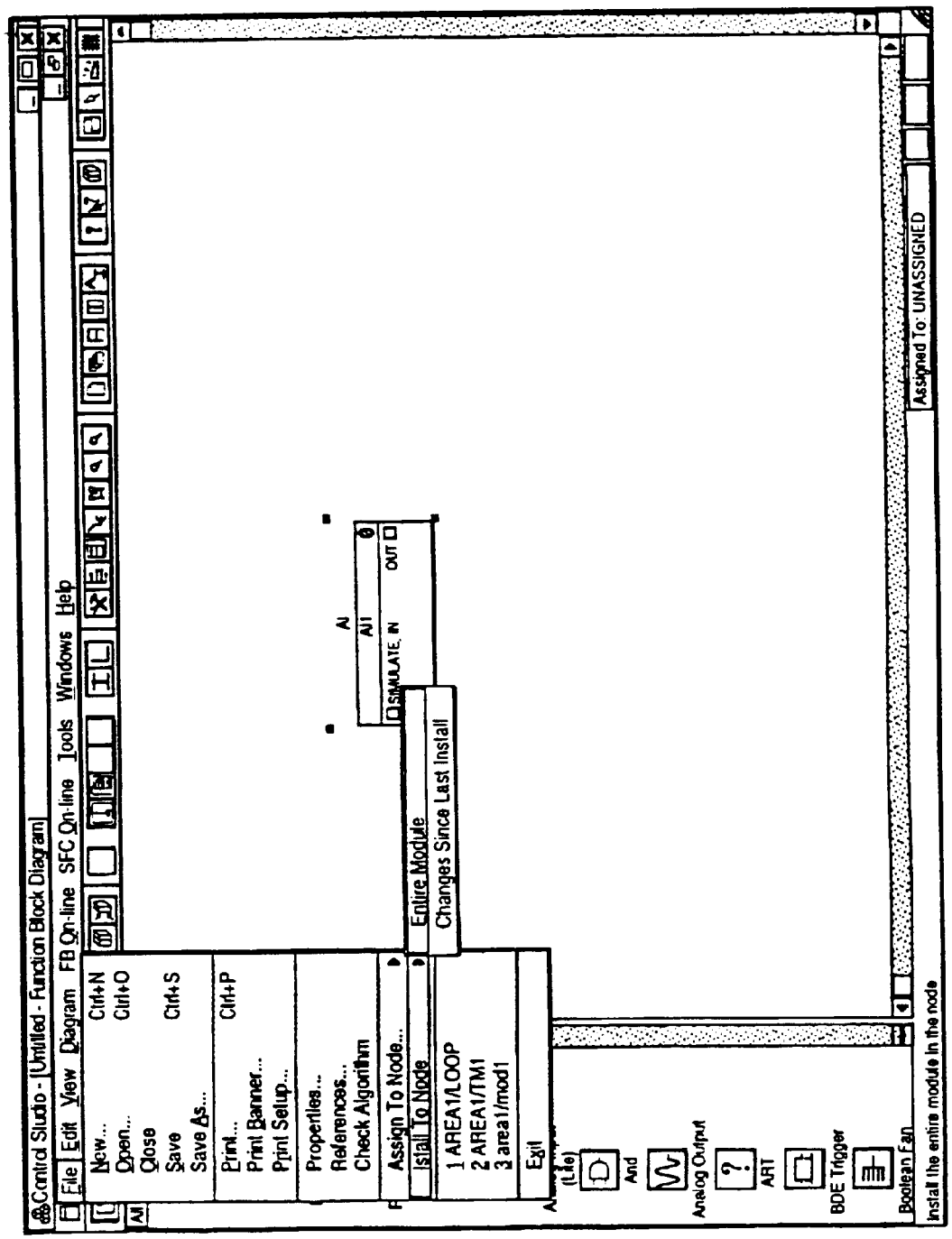
FIGS. 5a–5f are screen presentations of installing a completed process control diagram to a node of a process control environment in accordance with an embodiment of the present invention.
Figure 5B:
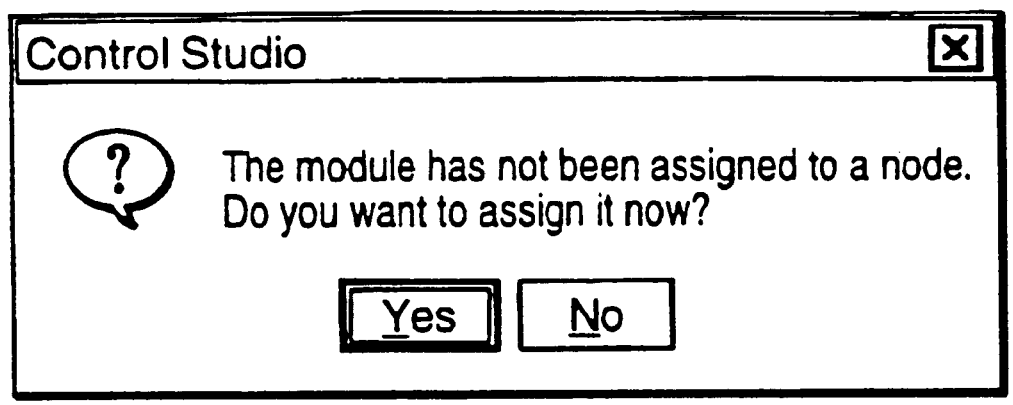
Figure 5C:
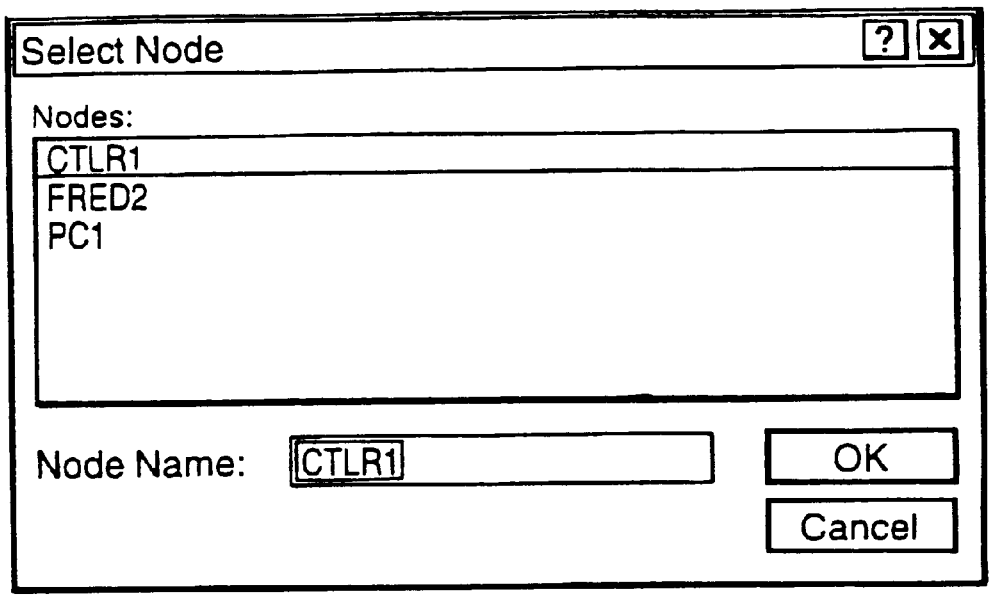
Figure 5D:
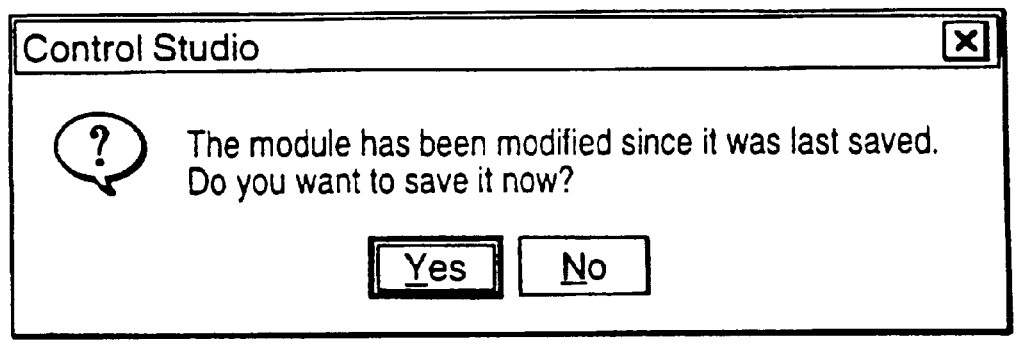
Figure 5E:
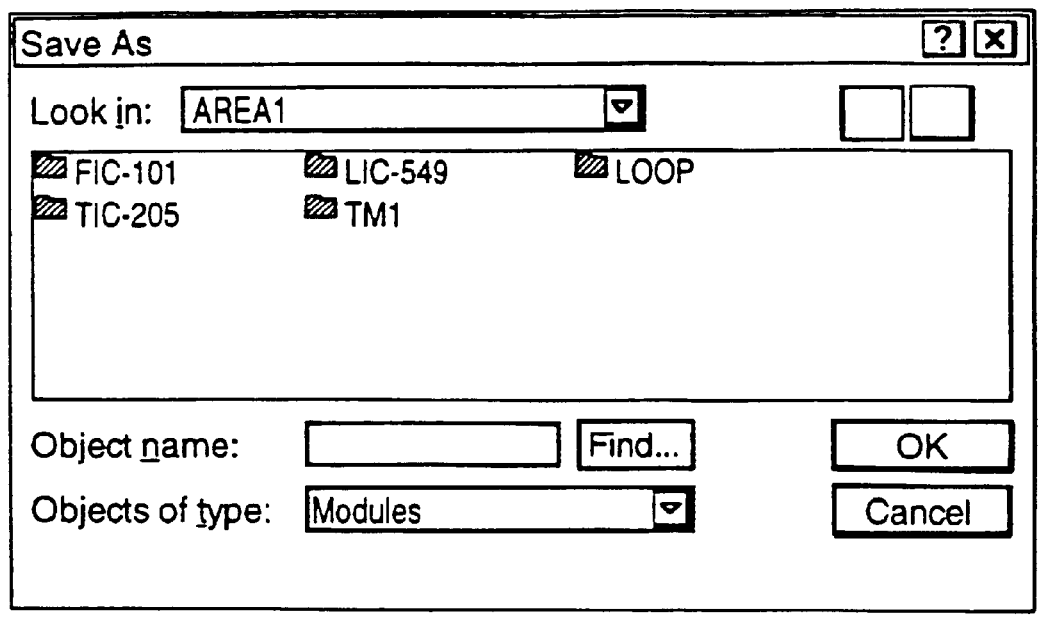
Figure 5F:
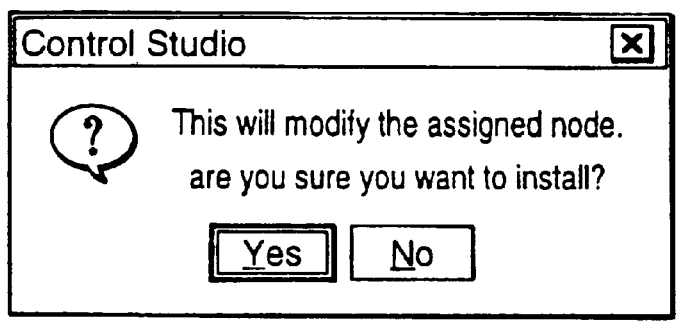

Referring to FIGS. 5a–5f; the process of installing a completed process control diagram to a node is shown. More specifically, as shown in FIG. 5a, when a user wishes to install a process control diagram to a node, the user selects the Install to Node item from the File menu as illustrated. The choices presented to the user are whether to install the entire module or just the changes since the last install operation was performed. When the user selects install entire module, a window is presented that informs the user that the module has not been assigned to a node and asking whether the user wishes to install the module to a node. (See FIG. 5b.) Next the user is presented with a list of nodes from which the user selects the appropriate node for configuring (see FIG. 5c). After the user selects the node for configuring, the user is presented with a window asking whether the user wishes to update the module (see FIG. 5d). The user is then requested to name the module (see FIG. 5e). After the user selects or generates a name, the user is asked whether the user is sure that the user wishes to perform the install procedure (see FIG. 5f). By answering yes, the control studio object system 130 automatically performs the install to the selected module.

Implementation of Control Studio Object System

The process control environment 100, and specifically, the control studio object system 130, is implemented using an object-oriented framework. An object-oriented framework uses object-oriented concepts such as class hierarchies, object states and object behavior. These concepts, which are briefly discussed below, are well known in the art. The present object-oriented framework is written using the object-oriented C++ programming language, which is well-known in the art.

The building block of an object-oriented framework is an object. An object is defined by a state and a behavior. The state of an object is set forth by fields of the object. The behavior of an object is set forth by methods of the object. Each object is an instance of a class, which provides a template for the object. A class defines zero or more fields and zero or more methods.

Fields are data structures which contain information defining object data or a portion of the state of an object. Objects which are instances of the same class have the same fields. However, the particular information contained within the fields of the objects can vary from object to object. Each field can contain information that is direct, such as an integer value, or indirect, such as a reference to another object.

A method is a collection of computer instructions which can be executed in processor 116 by computer system software. The instructions of a method are executed, i.e., the method is performed, when software requests that the object for which the method is defined perform the method. A method can be performed by any object that is a member of the class that includes the method. The particular object performing the method is the responder or the responding object. When performing the method, the responder consumes one or more arguments, i.e., input data, and produces zero or one result, i.e., an object returned as output data. The methods for a particular object define the behavior of that object.

Classes of an object-oriented framework are organized in a class hierarchy. In a class hierarchy, a class inherits the fields and methods which are defined by the superclasses of that class. Additionally, the fields and methods defined by a class are inherited by any subclasses of the class. I.e., an instance of a subclass includes the fields defined by the superclass and can perform the methods defined by the superclass.

Accordingly, when a method of an object is called, the method that is accessed may be defined in the class of which the object is a member or in any one of the superclasses of the class of which the object is a member. When a method of an object is called, process control environment 100 selects the method to run by examining the class of the object and, if necessary, any superclasses of the object.

A subclass may override or supersede a method definition which is inherited from a superclass to enhance or change the behavior of the subclass. However, a subclass may not supersede the signature of the method. The signature of a method includes the method's identifier, the number and type of arguments, whether a result is returned, and, if so, the type of the result. The subclass supersedes an inherited method definition by redefining the computer instructions which are carried out in performance of the method.

Classes which are capable of having instances are concrete classes. Classes which cannot have instances are abstract classes. Abstract classes may define fields and methods which are inherited by subclasses of the abstract classes. The subclasses of an abstract class may be other abstract classes; however, ultimately, within the class hierarchy, the subclasses are concrete classes.

All classes defined in the disclosed preferred embodiment, except for mix-in classes which are described below, are subclasses of a class, CObject. Thus, each class that is described herein and which is not a mix-in class inherits the methods and fields of class CObject, which is a base class within the Microsoft Foundation class framework.

More specifically, control studio object system 130 is implemented using the Foundation classes version 4.0 of the Microsoft developers kit for Visual C++ for Windows NT version 3.51.

FIGS. 6–11 show the classes of control studio object system 130 and how these classes descend from various Foundation classes.

Figure 6:
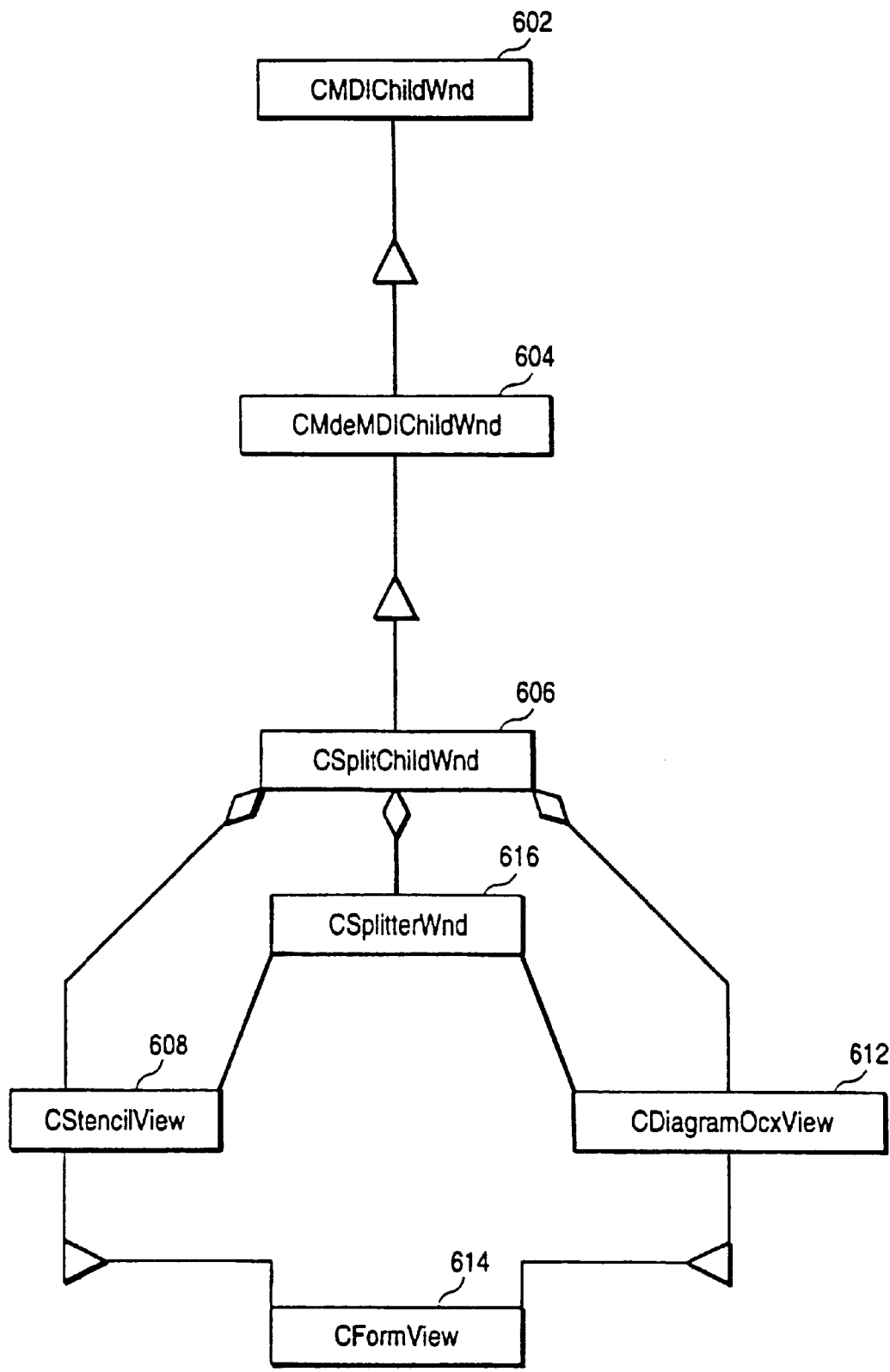
FIG. 6 is a block diagram showing the class hierarchy of control studio object system diagram view classes.

Referring to FIG. 6, control studio object system 130 (of FIG. 1) includes a plurality of classes which descend from and are related to the foundation class CMDIChildWnd 602. Class CMdeMDIChildWnd 604 descends from class CMDIChildWnd 602. Class CSplitChildWnd 606 descends from class CMDIChildWnd 604. Classes CStencilView 608, CSplitterWnd 610 and CDiagramOcxView 612 are aggregated with class CSplitChildWnd 606. Classes CStencil View 608 and CDiargramOC)CView 612 descend from foundation class CFormView 614.

Class CMDIChildWnd 602 is a frame window for a child window of a multiple document interface application. Class CMdeMDIChildWnd 604 removes the title text from the screen presentation. Class CSplitChildWnd 606 provides management of its children in a split window fashion as is known in the art. Class CStencilView 608 maintains a CList stencil control and manages the stencil user interface of the stencil portion. Class CDiagramOcxView 612 manages the diagram user interface of the diagram portion and contains an instance of a diagram old custom control (OCX). Class CSplitterWnd 610 is a foundation class which controls splitting panes as is well known in the art. Class CFormView 614 is a foundation class for containing control classes.

Figure 7:
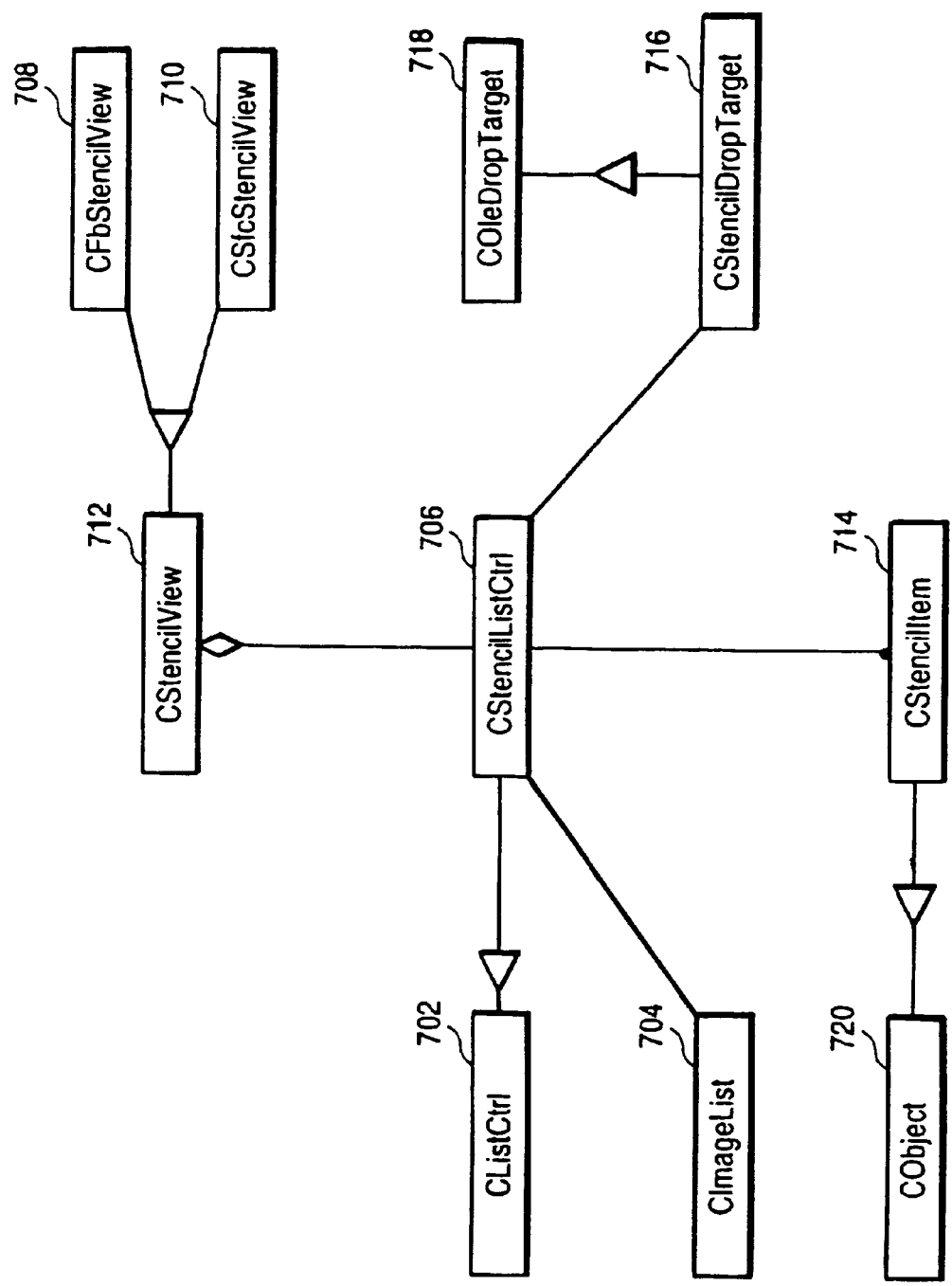
FIG. 7 is a block diagram showing the class hierarchy of control studio object system stencil classes.

Referring to FIG. 7, control studio object system 130 (of FIG. 1) includes a plurality of classes which descend from and are related to the foundation classes class CListCtrl 702 and CImageList 704. More specifically, classes CStenciListCtrl 706 descends from class CListCtrl 702. Class CStencilView 712 is aggregated with CStencilListCtrl 706. Classes CFbStencilView 708 and CSfcStencilView 710 descend from class CStencilView 712. Foundation class CImageList 704, class CStencilItem 714 and class CStencilDropTarget 716 are associated with Class CStenciListCtrl 706. Class CStencilDropTarget 716 descends from class COleDropTarget 718. Class CStencilItem 714 descends from foundation class CObject 720.

Class CListCtrl 702 is a foundation class that encapsulates the functionality of a list view control. Class CImageLst 704 is a foundation class that encapsulates the functionality of an image list. Class CStencilListCtrl 706 manages stencil items, provides a view of the stencil items and provides the drag source capability. Class CFBStencil View 708 controls the stencil or stencils used for creating function block diagrams. Class CSfcStencilView 710 controls the stencil or stencils used for creating SFC diagrams. CStencilItem 714 contains the drag/drop information for a single item in the stencil list control. CStencilDropTarget 716 controls drag and drop notification messages for class CStencilListCtrl 706. COleDropTarget 718 is a foundation class which encapsulates the functionality of dropping in a drag/drop operation.

Figure 8A:
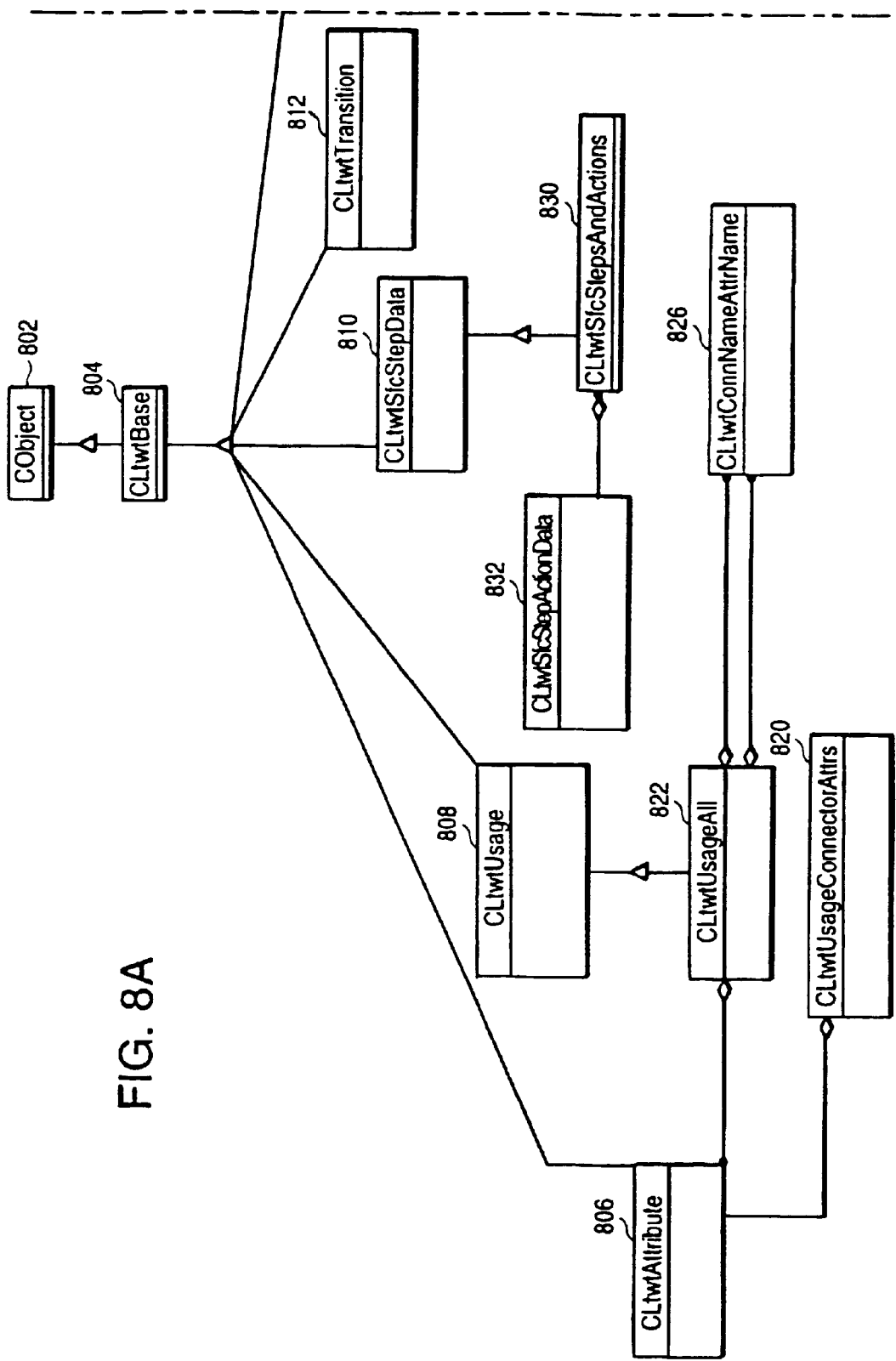
FIG. 8 is a block diagram showing the class hierarchy of control studio object lightweight classes that descend from class CObject.
Figure 8B:
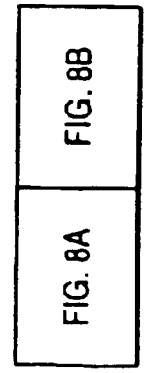
Figure 8B:
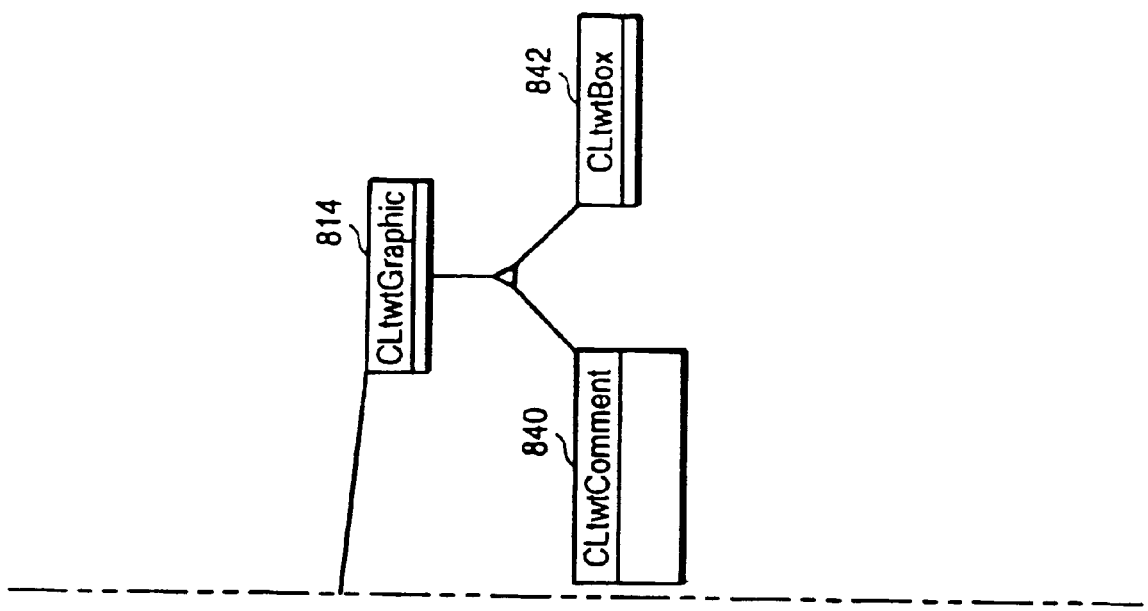

Referring to FIG. 8, control studio object system 130 (of FIG. 1) includes a plurality of classes which descend from the foundation class CObject 802. More specifically, classes CltwtBase 804 descends from class CObject 802. Classes CltwtAttribute 806, CltwtUsage 808, CLtwtSfcStepData 810 CLtwtSFCTransistionData 812 and CLtwtGraphic 814 descend from class CltwtBase 804. Each of these classes represent different types of diagram items that may be used in a drag and drop operation. Class GLtwtUsageAll 822 descend from class CLtwtUsage 808. Classes CLtwtUsageConnectorAttrs 820 and GLtwtUsageAll 822 are also aggregated with class CLtwtAttribute 806. Class CLtwtConnNameAttrName 826 is aggregated with class CLtwtUsageAll 822. Class CLtwtSfcStepsAll 830 descends from class CLtwtSfcStepData 810. Class CLtwtSfcStepActionData 832 is aggregated with class CLtwtSfcStepsAnd Actions 830. Classes CLtwtComment 840 and CLtwtBox 842 descend from class CLtwtGraphic 814.

Class CLtwtAttribute 806 stores data from the database or written into the database about attributes. Class CLtwtUsage 808 is a light weight data holder for usage information which is used to transfer data between the database and applications; this class is primarily used by function block diagrams, but sequential function chart algorithms use this class in a limited manner. Class CLtwtUsageAff 822 is a subclass of CLtwtUsage class 808 and contains additional information, including a list of input and output CLtwtConnNameAttrName objects and a list of CLtwtAttributes objects; this class is used in drag and drop to set any attribute or connection overrides that a user may have made to a specific usage. Class CLtwtSfcStepData 810 is a light weight data holder which represents a step in a sequential function chart algorithm. Class CLtwtGraphic 814 implements behavior common to all graphic objects, such as boxes and comments. Class CLtwtSfcStepActionData 832 is a representation of a single sequential function chart action. Class CLtwtStepsAll 830 is a specific representation of a step that contains actions used for drag and drop. Class CLtwtBox 842 is a subclass of CLtwtGraphic 814 which represents a database object, which in turn represents a box or a rectangle on an algorithm. Class CLtwtComment 840 is a subclass of CLtwtGraphic 814 which represents a database object, which in turn represents text a user has entered on an algorithm. Class CLtwtBase 804 is an abstract base class which provides a way to manage a representation of those database objects which can appear on a diagram. Class CLtwtSFCTransistionData 812 is a representation of a transition object in an SFC algorithm. Class CLtwtConnNameAddrName 826 is a representation of an attribute and the name of the connector associated with the attribute; only certain attributes have connectors associated with them.

Figure 9:
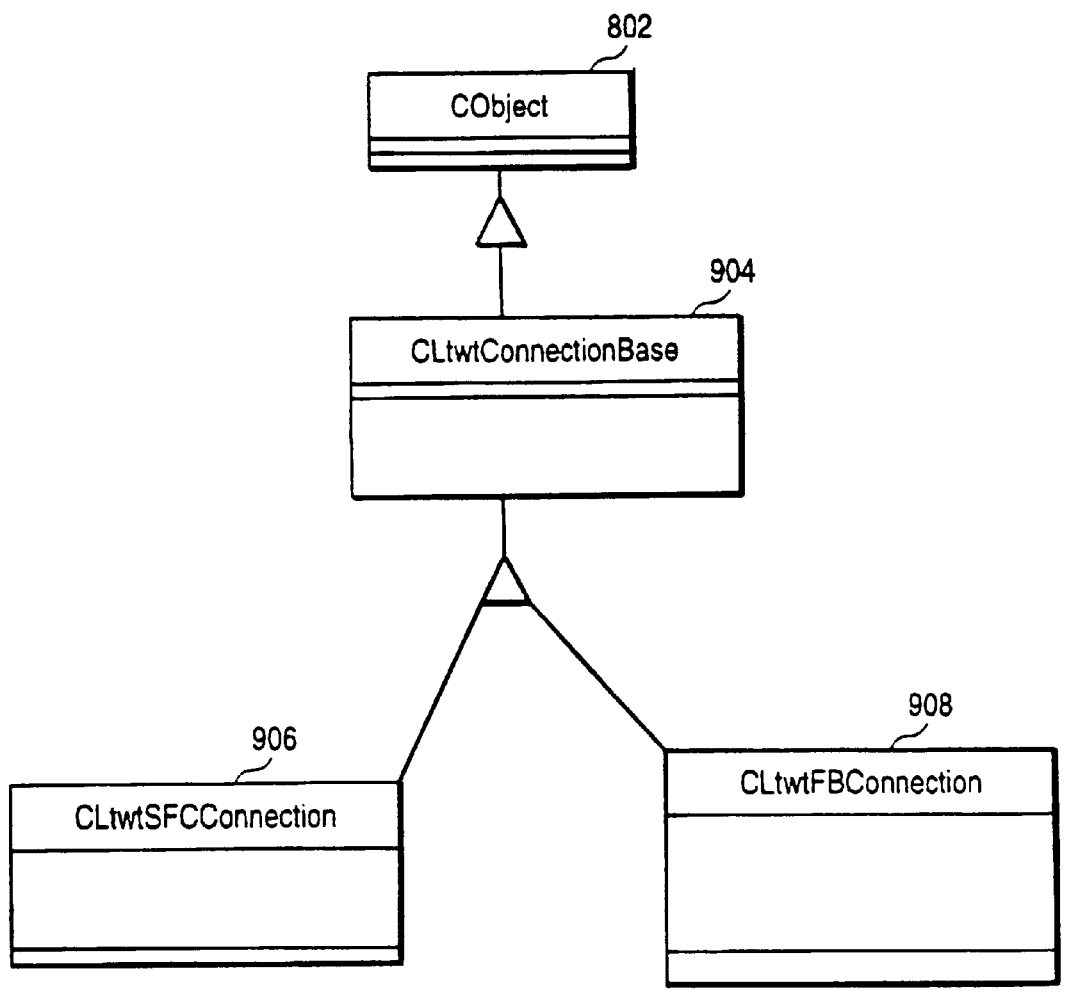
FIG. 9 is a block diagram showing the class hierarchy of control studio object system connection classes that descend from class CObject.

Referring to FIG. 9, control studio object system includes a plurality of classes which also descend from the foundation class CObject 802 and which relate to connecting other items. More specifically, class CLtwtConnectionBase 904 descends from class CObject 802. Classes CLtwtSFCConnection 906 and CLtwtFBCConnection 908 descend from class CLtwtConnectionBase 904.

Class CLtwtConnectionBase 904 is a representation of a connection object. In the preferred embodiment, the two types of connection objects are function block or sequential function chart connections. CLtwtSfcConnection 906 provides a representation of a connection on a sequence function chart algorithm in the database. Class CLtwtFbConnection 908 provides a representation of a connection on a function block algorithm in the database.

Figure 10:
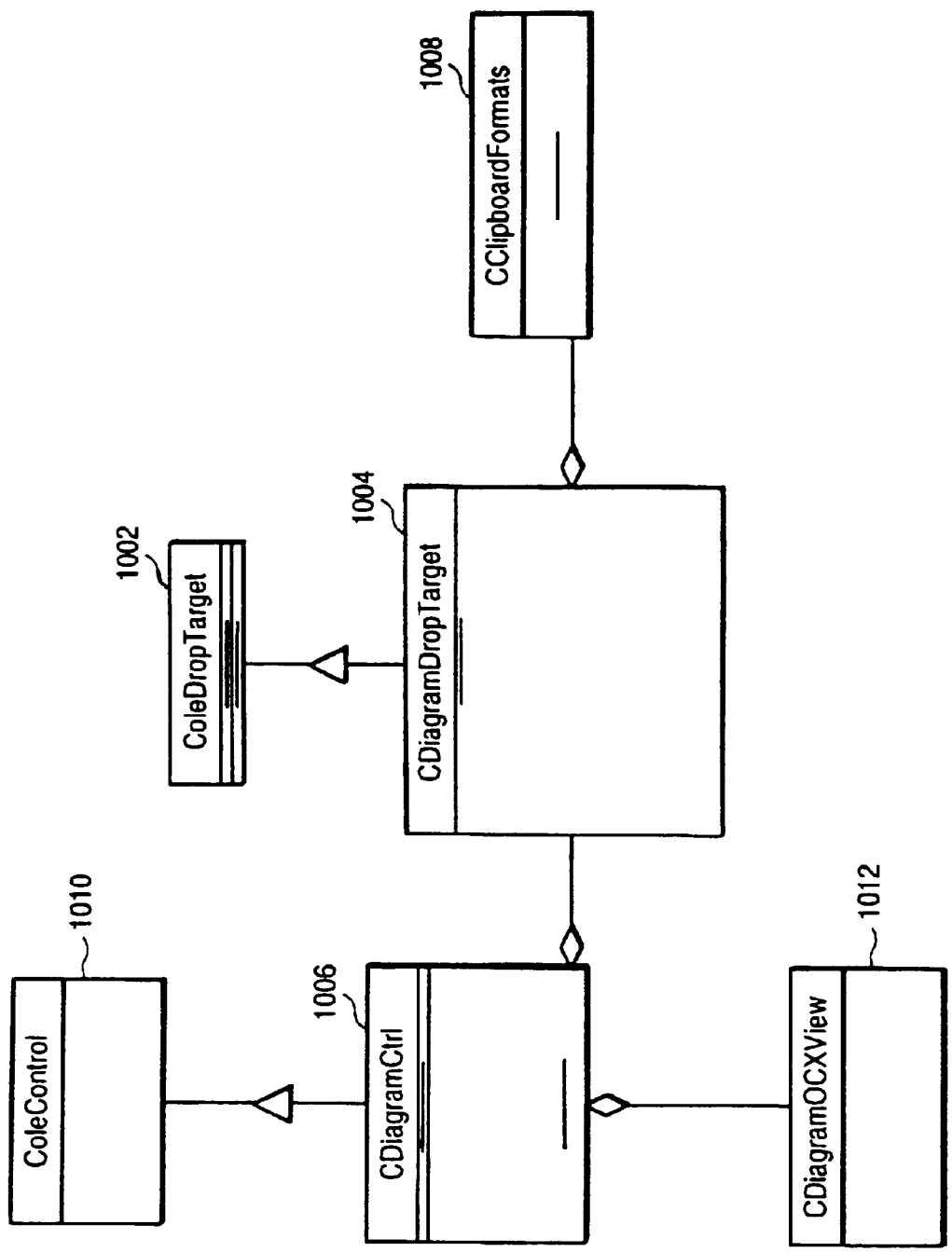
FIG. 10 is a block diagram showing the class hierarchy of a diagram portion of the control studio object system drag and drop classes.

Referring to FIG. 10, control studio object system 130 (of FIG. 1) includes a class which descends from the foundation class COleDropTarget 1002. More specifically, class CDiagramDropTarget 1004 descends from foundation class COleDropTarget 1002. Classes CDiagramCtrl 1006 and CClipboardFormats 1008 are aggregated with class CDiagramDropTarget 1004. Class CDiagramCtrl 1006 descends from class COleControl 1010. CDiargramCtrl 1006 is aggregated with class CDiagramOcxView 1012.

Class CDiagramCtrl 1006 provides a graphical representation and a means of manipulation of objects for the function block and sequential function chart algorithm; this class is an OLE control class. Class CDiagramDropTarget 1004 represents the target window of a diagram drag and drop operation; this class determines whether to accept any data dropped onto it and invokes the OnDrop method of the CDiagramCtrl object (which in turn fires the OnDrop event to the container which actually creates the dropped object in the database). Class CClipboardFormats 1008 holds an array of registered formats supported for a drop by OCX. Class COleControl 1010 is a foundation class for developing OLE controls. Class CDiagrmOcxView 1012 is discussed with respect to FIG. 6.

Figure 11:
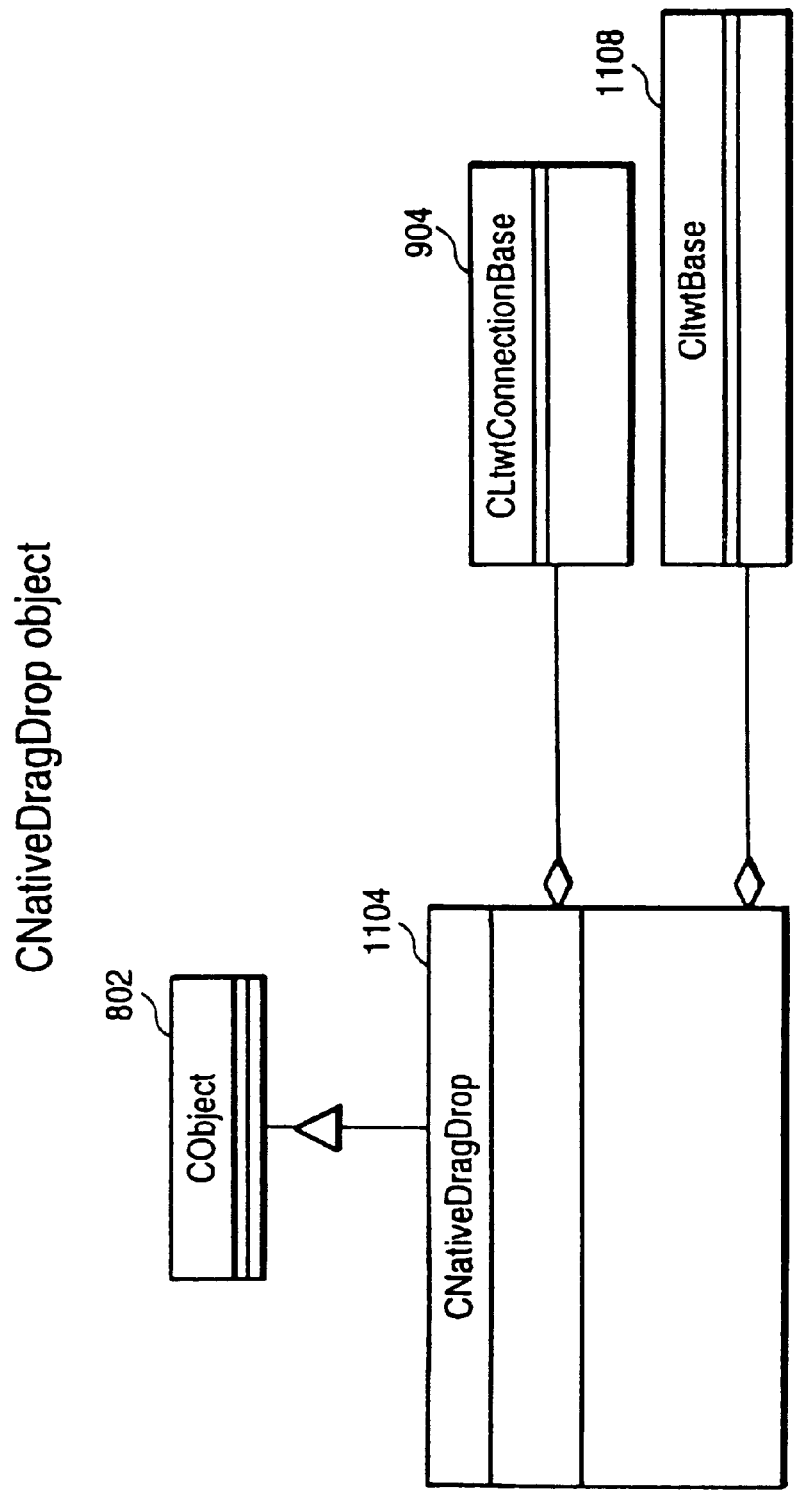
FIG. 11 is a block diagram showing the class hierarchy of control studio object system native drag and drop object classes.

Referring to FIG. 11, control studio object system 130 (of FIG. 1) also includes a class which descends from class CObject 802 and which relates to the function of dragging and dropping items or cutting and pasting items that already exist in the diagram. Class CNativeDragDrop 1104 descends from class CObject 802. Classes CLtwtConnectionBase 904 and CltwtBase 1108 are aggregated with class CNativeDragDrop 1104.

Class CNativeDragDrop 1104 is a collection class that holds a list of CLtwtBase and CLtwtConnectionBase objects that currently exist on the diagram and that are to be dragged and dropped, or cut/copied and pasted; this object also stores a position offset which aids in setting the appropriate location during the paste/drop operation. A class CNativeDragDrop 1104 object provides methods to serialize itself to and from a shared file and to set and get data from the COleDataSource and COleDataObject objects. Class CLtwtBase 1108 is an abstract base class for objects that represent data objects in the database. Class CLtwtConnectionBase 904 is discussed above with reference to FIG. 9.

Operation of Control Studio Object System

The control studio object system 130 includes a plurality of modes of operation for adding objects to the diagram portion of object system 130. These modes of operation include adding an object to the diagram portion and adding an object to a stencil portion.

When adding a stencil object from the stencil portion to the diagram portion, the user positions a cursor (not shown) over a stencil object in the source stencil window, i.e., the stencil portion, and actuates a pointing device such as a mouse. The stencil object in the stencil window is highlighted to indicate selection. With the cursor over the selected stencil object, the user holds down the left mouse button and begins dragging the cursor by moving the mouse. The workstation responds by displaying a drag image of the stencil that moves with the cursor. The user next positions the cursor over the diagram portion. As the user continues to drag the cursor across the diagram window, the object system 130 causes the cursor to be updated to show that it is above a drop target by representing a cursor arrow with a rectangle coupled thereto. If the user moves the cursor outside the edge of the diagram portion window, the system represents the cursor with a circle with a diagonal line through it to indicate that it is not above a drop target. When the user has moved the cursor to the position at which the new object is to be added to the diagram, the user releases the left mouse button. In response, the system removes the displayed drag image, redisplays the cursor as normal, and creates and displays a corresponding diagram object in the diagram window. If instead of releasing the mouse button, the user presses the escape key on the keyboard, the system cancels the drag and drop. If the user releases the mouse button while still in the stencil portion window, the system responds by moving the selected stencil object to the new location in the stencil portion window, and resetting the cursor to normal. The classes used to implement this functionality are CStenciListCtrl, CImageList, CDiagramDropTarget, CStencilDropTarget, CStencilltem and CDiagramCtrl, CDiagramOcxView, CNativeDragDrop.

Figure 12A:
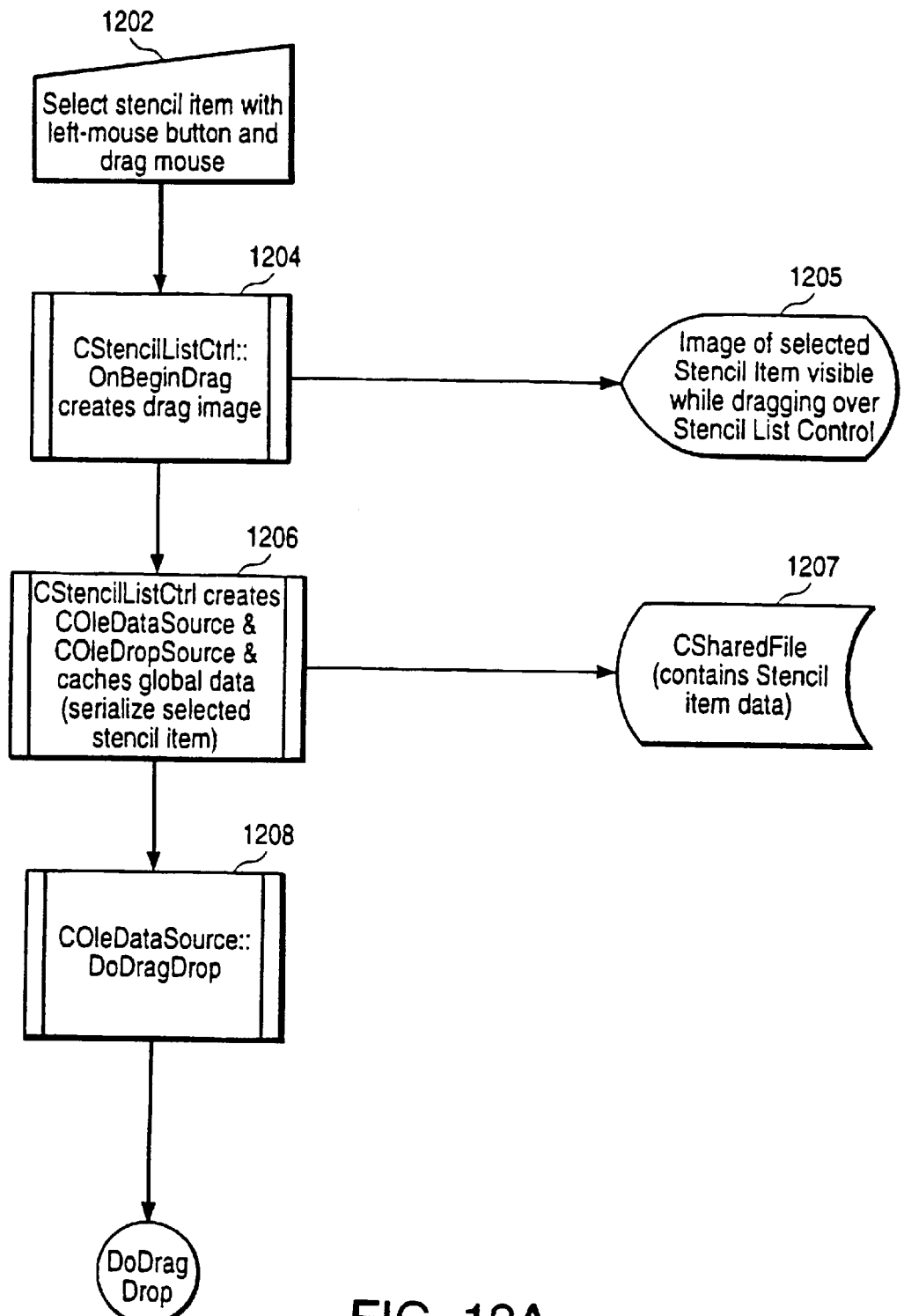
FIG. 12A–12E are flow charts showing a stencil drag and drop operation of a control studio object system in accordance with the present invention.
Figure 12B:
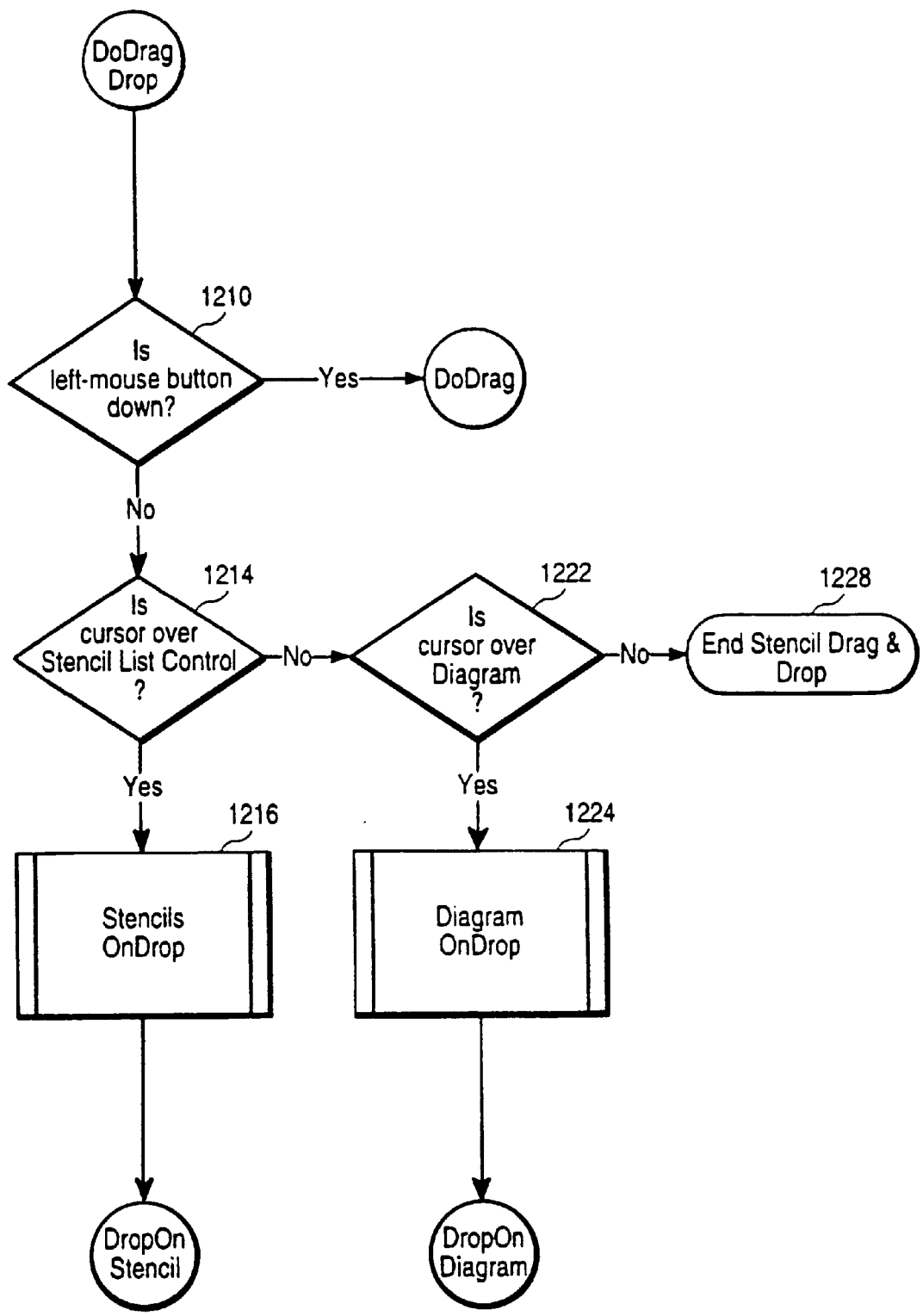

Referring to FIG. 12A, the operation of control studio object system 130 during a stencil drag/drop operation is shown. A drag/drop operation starts at step 1202 when the user selects a stencil object with the left mouse button and begins to drag the stencil object. Control then transitions to processing step 1204 during which the OnBeginDrag method of class CStenciListCtrl 706 is invoked. Method OnBeginlrag creates a drag image of the stencil object 1205. On completion of step 1204, control transitions to processing step 1206 during which the method CStencilListCtrl creates COleDataSource and COleDropSource objects. Step 1206 then caches the data from the selected stencil object into a CSharedFile 1207. From step 1206, control transitions to step 1208 during which the DoDragDrop method of the ColeDataSource object is invoked. Control then transitions to decision step 1210 Referring to FIG. 12B, during decision step 1210, control studio object system 130 determines whether the left mouse button is still actuated by the user. If the mouse button is actuated, the control transitions to decision step 1:212 (see FIG. 12C).

If the mouse button is not actuated, then control studio object system 130 transitions to decision step 1214. During decision step 1214, control studio object system 130 determines whether the cursor is positioned over the stencil portion which functions as a Stencil List Control . If the cursor is positioned over the stencil portion, then control transitions to processing step 1216 during which the Stencils OnDrop event is activated. After the Stencils OnDrop event is activated, control transitions to decision step 1220 (see FIG. 12e).

If the cursor is not positioned over Stencil List Control, then control transitions to decision step 1222. During decision step 1222, control studio object system 130 determines whether the cursor is over a diagram portion. If the cursor is over a diagram portion, the control transitions to processing step 1224 and the Diagram OnDrop event is activated. After the Diagram OnDrop event is activated, control transitions to step 1226 (see FIG. 12d). If the cursor is not over a diagram at decision step 1222, then control transitions to termination step 1228 and the drag and drop operation is ended.

Figure 12C:
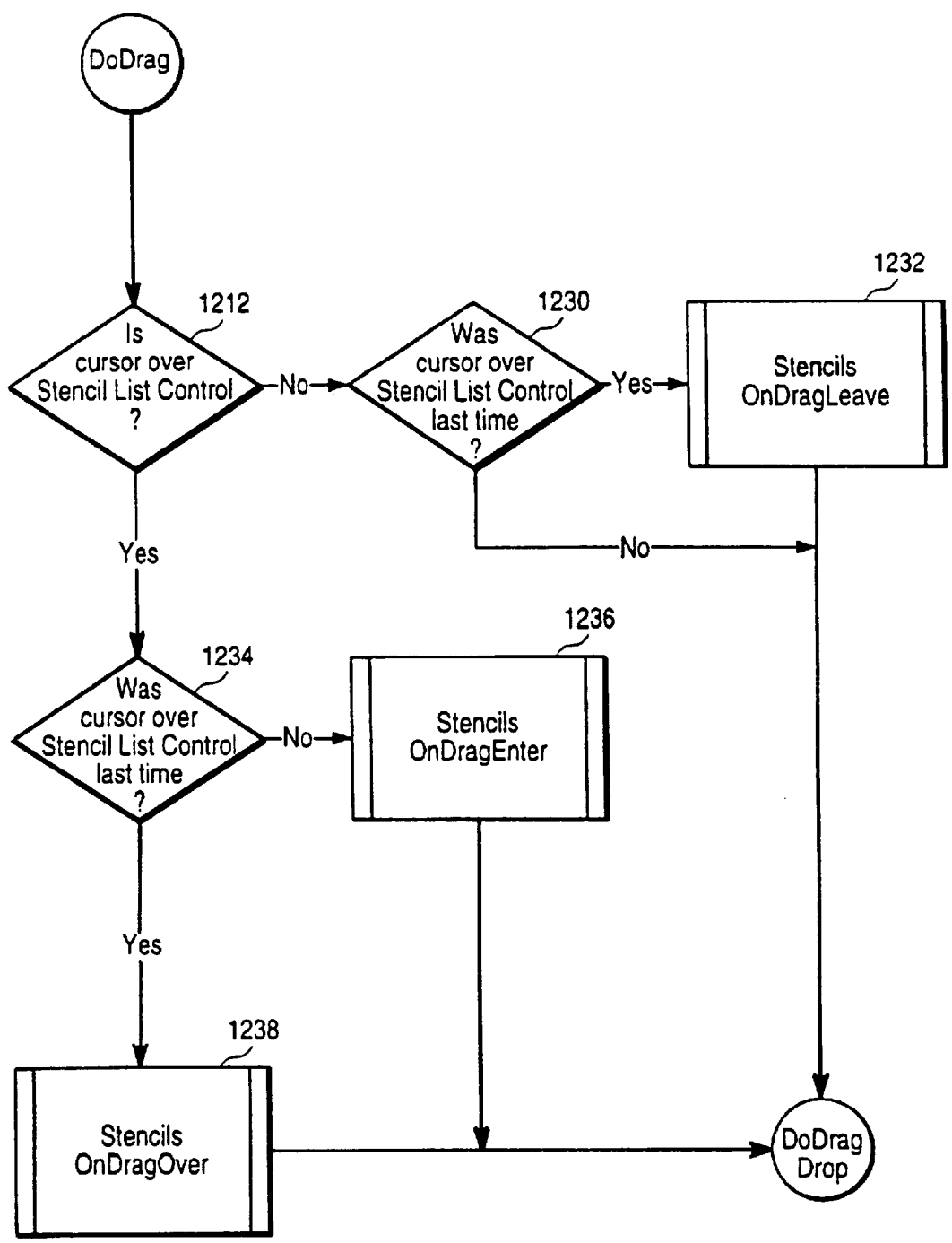

Referring to FIG. 12C, during decision step 1212, control studio object system 130 determines whether the cursor is positioned over the Stencil List Control. If the cursor it is not positioned over the Stencil List Control, then control transitions to decision step 1230. During decision step 1230, control studio object system 130 determines whether the cursor is was positioned over the Stencil List Control the last time the cursor position was checked. If the cursor was not positioned over Stencil Control List, then control transitions to decision step 1210(of FIG. 12D) . If the cursor was positioned over Stencil Control List the last time that the cursor position was checked then control transitions to step

1232. During step 1232, control studio object system 130 activates the OnDragLeave event to indicate that the cursor has left the stencil list control view. After the OnDragLeave event is activated, control transitions to decision step 1210.

If during decision step 1212, the cursor is positioned over Stencil List Control, control transitions to decision step 1234. During decision step 1234, control studio object system 130 determines whether the cursor was positioned over Stencil Control List the last time that object system 130 checked cursor position. If the cursor was not over Stencil Control List the last time that the cursor position was checked, then control transitions to processing step 1236. During processing step 1236, the OnDragEnter stencil event is activated; OnDragEnter indicates to the system that the cursor has entered the stencil list control window. If the cursor was positioned over Stencil Control List the last time that the cursor position was checked, then control transitions to processing step 1238. During processing step 1238, object system 130 activates the OnDragOver event; OnDragOver is used by object system 130 to determine the drop effect. Control transitions to decision step 1210 from both processing step 1236 and processing step 1238 after their respective events are activated.

Figure 12D:
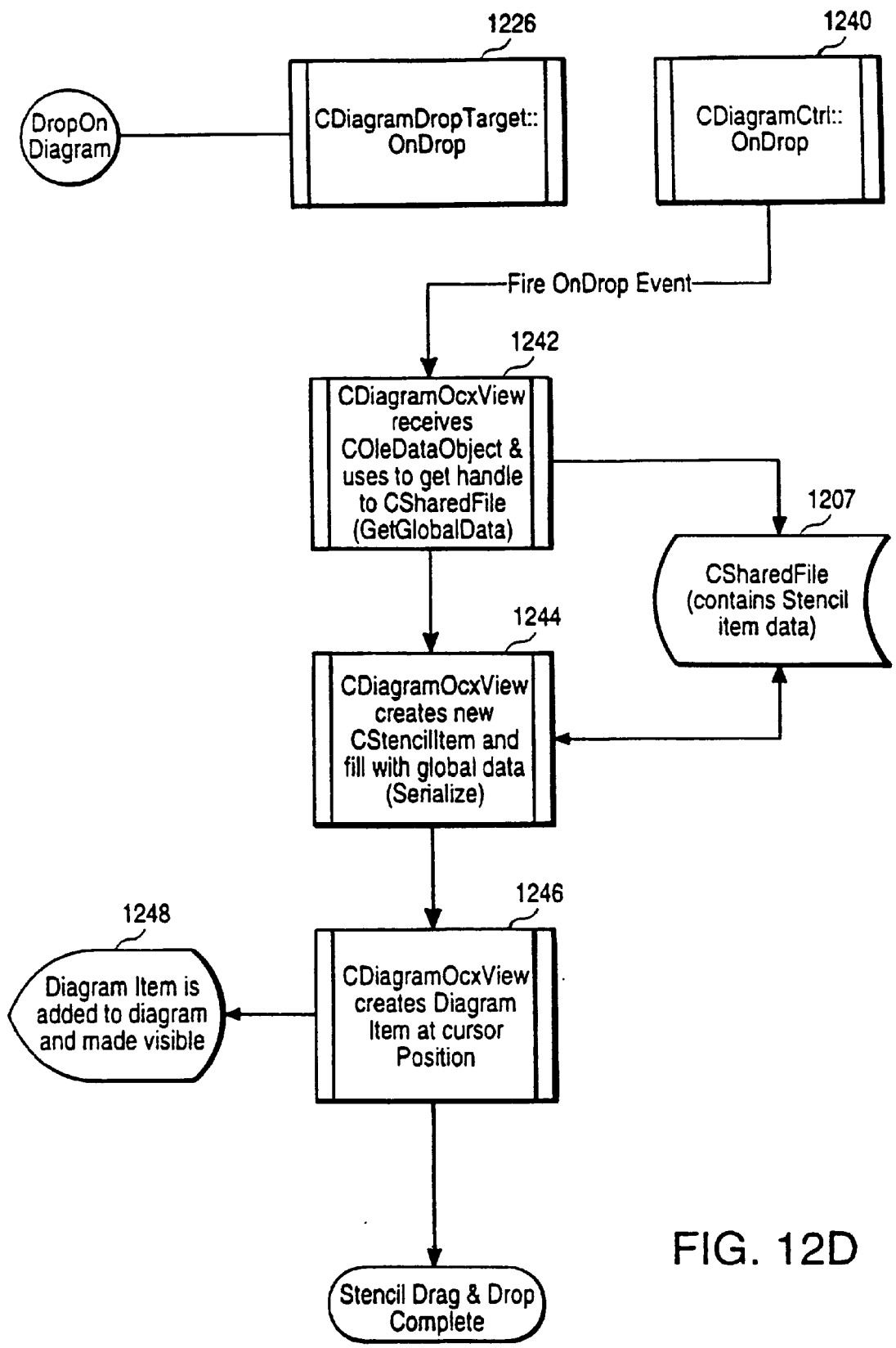

Referring to FIG. 12D, during processing step 1226, the OnDrop event for CDiagramDropTarget 104 is activated. After the OnDrop event is activated, control transitions to processing step 1240, during which step the OnDrop event for CDiagramCtrl is activated. Upon activation of the OnDrop event, control transitions to processing step 1242. During processing step 1242, the method CDiagramOcxView is invoked with COleDataObject as a parameter. Control studio object system 130 then obtains a handle to CSharedFile 1207 and transitions to processing step 1244. During processing step 1244, the method CdiagramOcxView creates a new CStencilItem object and fills it with the data from CSharedFile 1207. On completion of step 1244, control transitions to processing step 1246. During processing step 1246, CDiagramOcxView creates a diagram item 1248 located at the cursor position. After the diagram item is created, the drag and drop operation of the stencil object is complete.

Figure 12E:
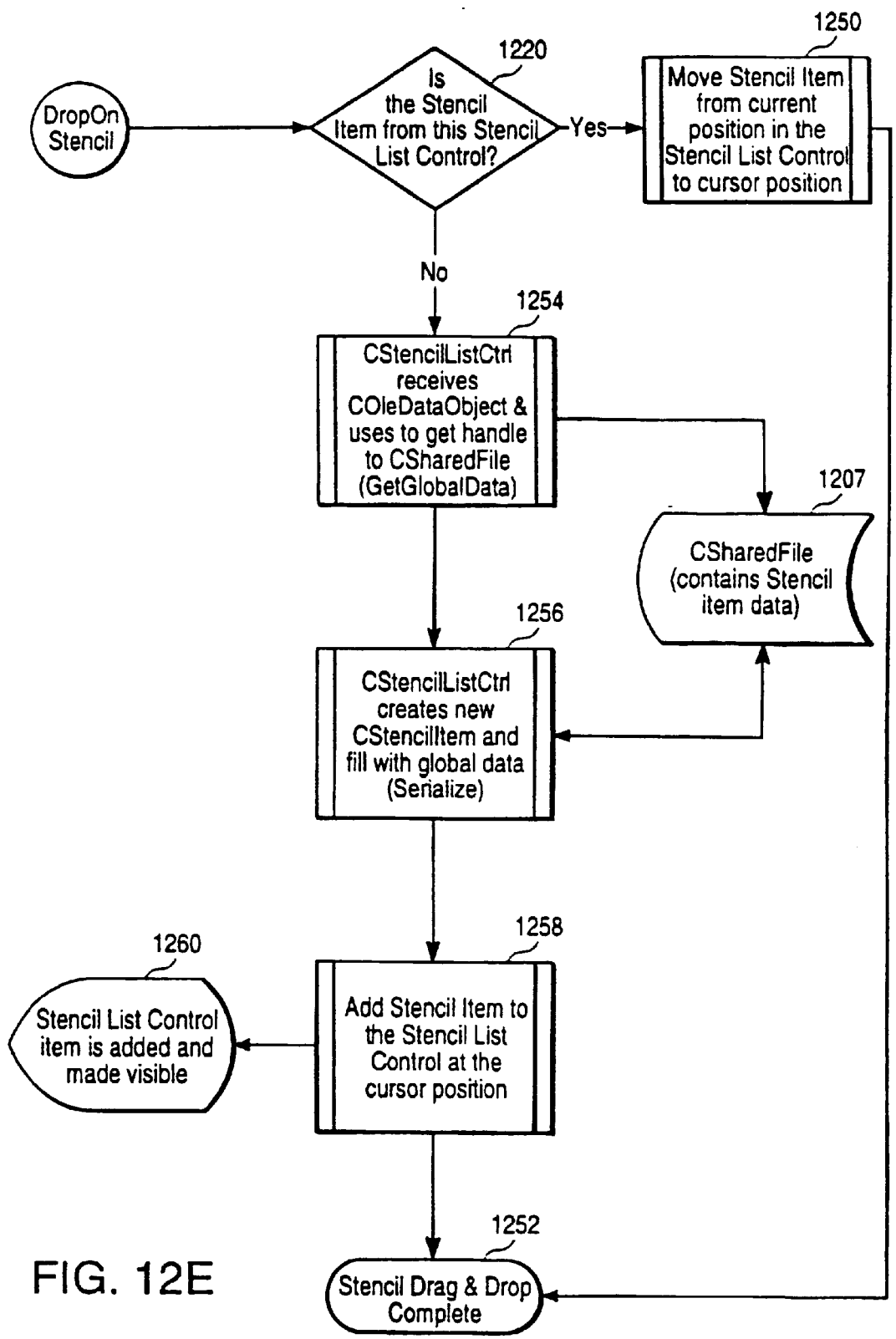

Referring to FIG. 12E, during decision step 1220, control studio object system 130 determines whether the Stencil object is from this Stencil List Control; which indicates whether the stencil item originated from the CStencilListCtrl over which the cursor is position. If the stencil object is from this Stencil List Control, then control transitions to processing step 1250. During processing step 1250, object system 130 moves the stencil object from its current position in the Stencil List Control to the cursor position. After the move of the stencil object is complete, control transitions to completion step 1252 and the drag and drop operation is complete. If the stencil object is not from this Stencil List Control, then control transitions to processing step 1254. During processing step 1254, the method CStencilListCtrl is invoked with the COleDataObject, which is used to obtain a handle to CSharedFile 1207. After the handle is obtained, control transitions to processing step 1256. During processing step 1256, the method CStenciListCtrl creates a new CStencilItem object and fills the object with the stencil object data form CSharedFile 1207. Control then transitions to processing step 1258. During processing step 1258, the stencil object is added to the Stencil List Control 1260 at the cursor position. Control then transitions to completion step 1252.

Figure 13A:
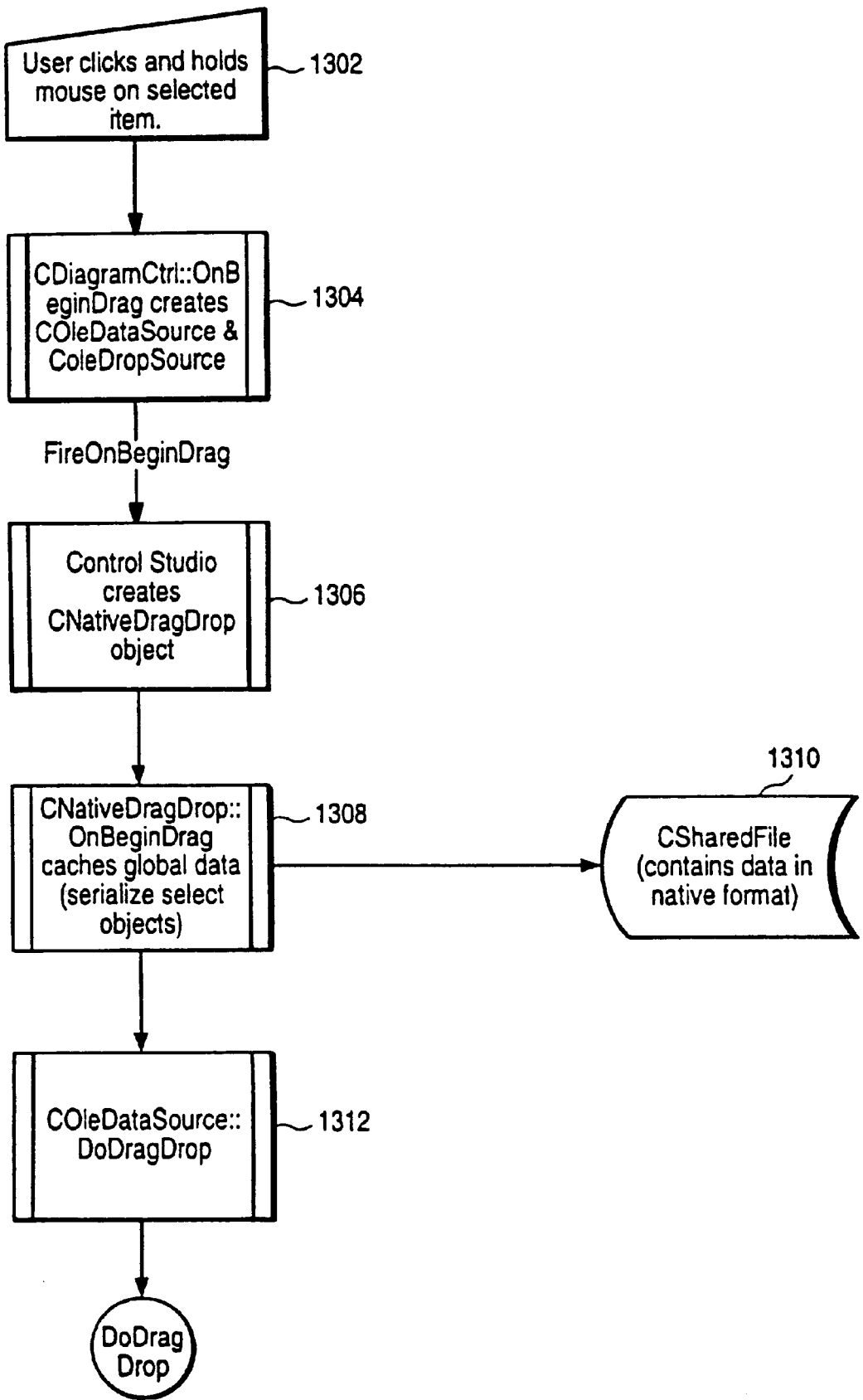
FIG. 13A–13D are flow charts showing a native drag and drop to a diagram portion of a control studio object system in accordance with the present invention.

Referring now to FIG. 13A, the operation of dragging and dropping one or more selected items within or between diagrams is shown. More specifically, a dragging and dropping operation is initiated at step 1302 by the user actuating and holding the mouse on a selected item. Control then transitions to processing step 1304. During processing step 1304, the OnBeginDrag.event of the CIDiagramCtrl class is activated. Activation of this event creates COleDataSource and COleDropSource objects and activates the OnBeginDrag event. Upon activation of the OnBeginDrag event, control transitions to processing step 1306. During processing step 1306, control studio object system 130 creates a CNativeDragDrop object, and invokes the OnBeginDrag method of the CNativeDragDrop object. Control then transitions to processing step 1308. During processing step 1308, the invoked OnBeginDrag method saves the data of all the selected objects into the shared memory file CSharedFile 1310. Control then transitions to processing step 1312, during which the CDiagramCtrl event invokes the DoDragDrop method of the COleDataSource object. Control then transitions to decision step 1320 (see FIG. 13B).

Figure 13B:
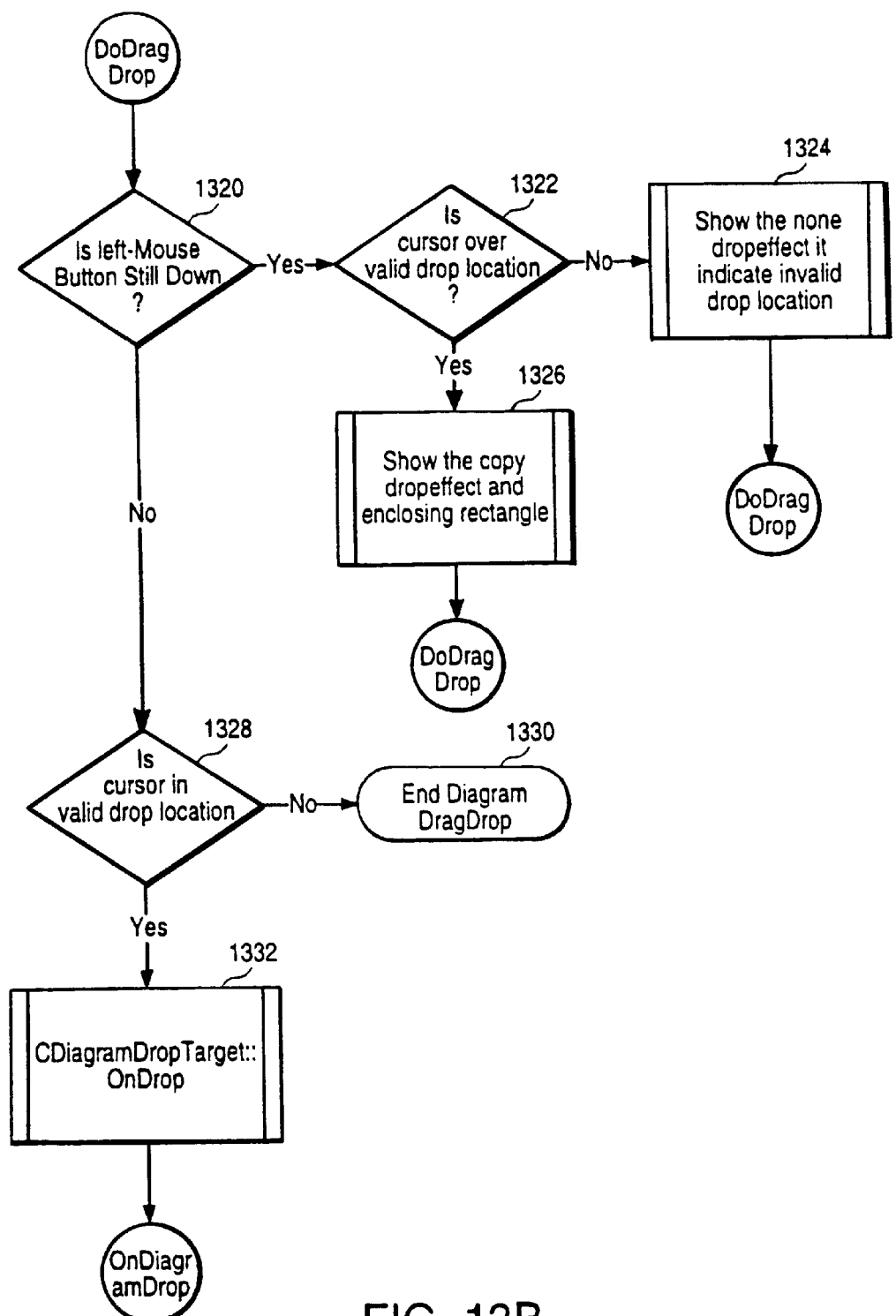

Referring to FIG. 13B, during decision step 1320 control studio object system 130 determines whether the mouse button is still actuated. If the mouse button is still actuated, then control transitions to decision step 1322. During decision step 1322 object system 130 determines whether the cursor is positioned over a valid drop location. If the cursor is not positioned over a valid drop location then control transfers to processing step 1324. During processing step 1324, CDiagramCtrl i06 updates the cursor to show that a drag and drop operation is occurring and also displays an enclosing outlined rectangle. Control then transitions back to decision step 1320.

If during decision step 1322, object system 130 determines that the cursor is positioned over a valid drop location, then control transitions to processing step 1326. During processing step 1326, object system 130 updates the cursor to indicate that it is not over a valid drop location. Control then transitions back to decision step 1320.

If during decision step 1320, class CDiagramCtrl 1006 determines that the mouse button has been released, control transitions to decision step 1328. During decision step 1328, object system 130 determines whether the cursor is positioned over a valid drop location. If the cursor is not positioned over a valid drop location, then control transitions to termination symbol 1330 and the drag and drop operation is terminated. If the cursor is positioned over a valid drop location, then control transitions to processing step 1332. During processing step 1332, the OnDrop method of CDiagramDropTarget is invoked. The CDiagramDropTarget OnDrop method calls the CDiagramCtrl OnDrop method at step 1342 which fires the OnDrop event. (see FIG. 13C).

Figure 13C:
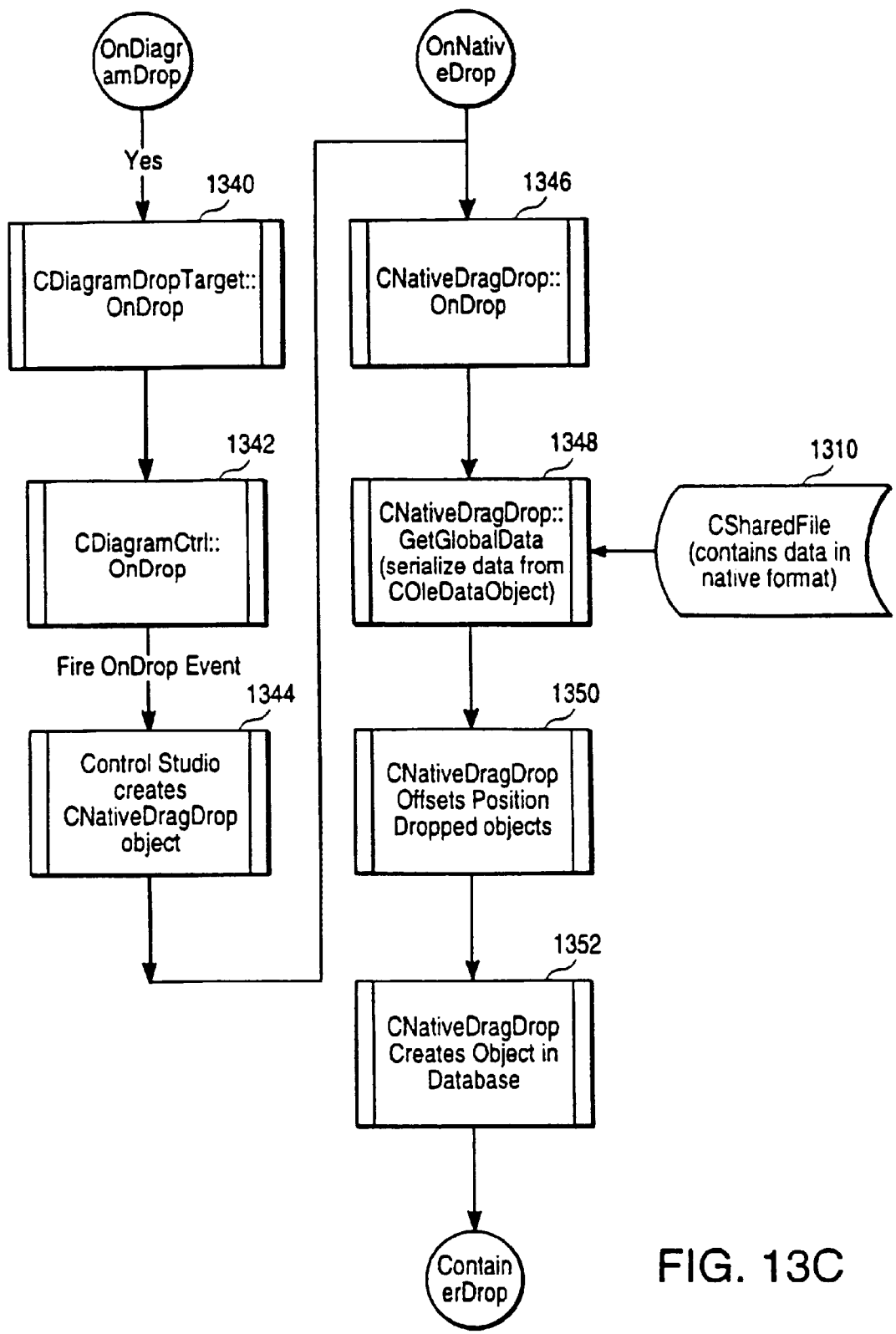

Referring to FIG. 13C, during processing step 1340, object system 130 invokes the OnDrop method of the CDiagramCtrl class,. After the OnDrop method is invoked, control transitions to processing step 1342. During processing step 1342, object system 130 fires the OnDrop event. After the OnDrop event is activated, control transitions to processing step 1344. During processing step 1344, object system 130 creates a CNativeDragDrop object and transitions to processing step 1346. During processing step 1346, object system 130 invokes the OnDrop method of the CNativeDragDrop object. Control then transitions to processing step 1348. During processing step 1348 the OnDrop method reads the data previously serialized to a shared file 1310. Control then transitions to processing step 1350. During processing step 1350, the method CNativeDragDrop offsets the positions of the dropped objects. Control then transitions to processing step 1352. During processing step 1352, object system 130 creates the new object in the database. Control then transitions to decision step 1360 (see FIG. 13D)

Figure 13D:
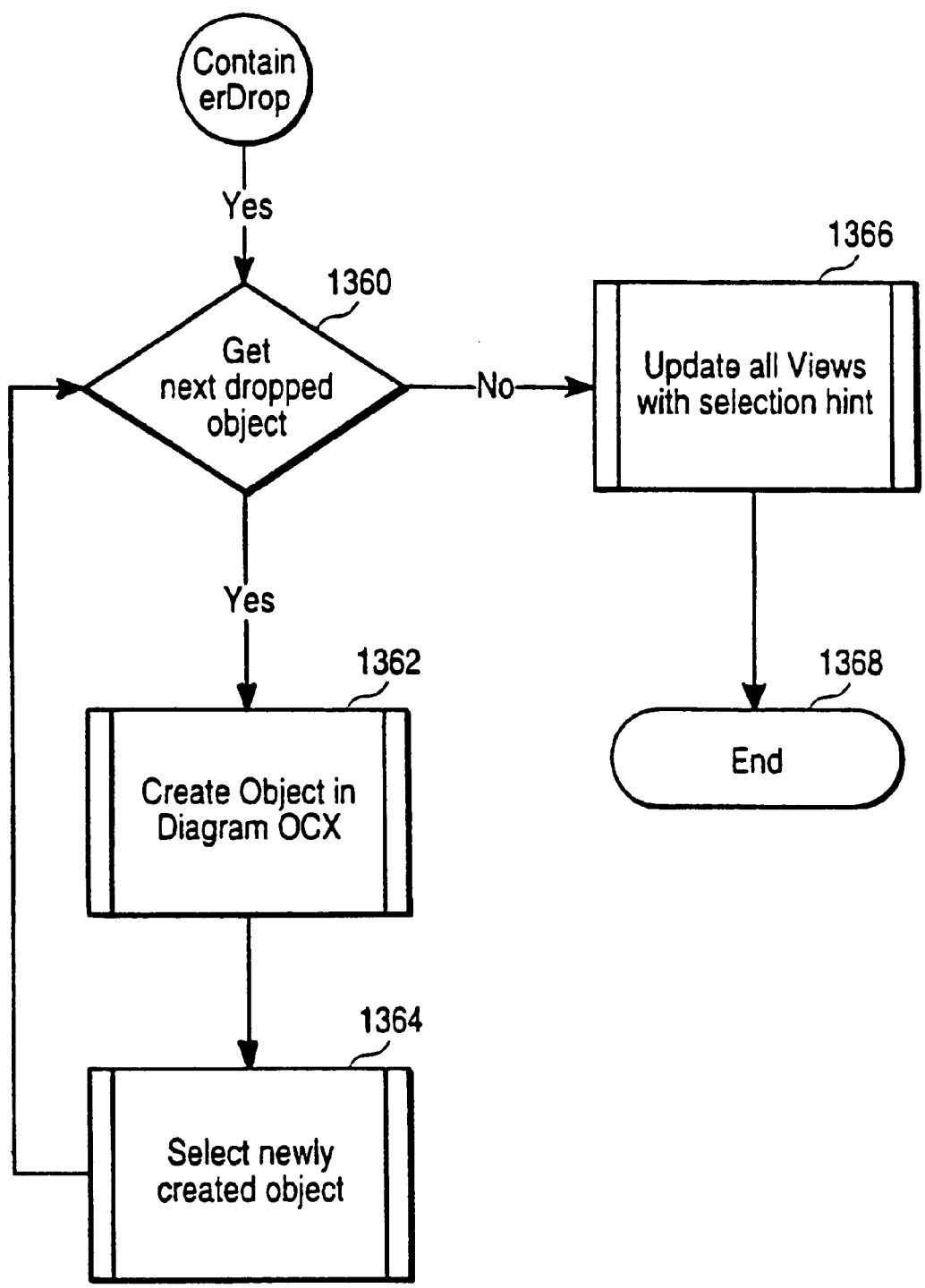

Referring to FIG. 13D, during decision step 1360, the object system determines whether there is another dropped object. If there is another dropped object, then control transitions to processing step 1362. During processing step 1362, object system 130 creates the dropped object in the diagram portion. Control then transitions to processing step 1364 During processing step 1364, object system 130 selects the newly created diagram object and transitions to decision step 1360 to determine whether there is another dropped object. If there are no more dropped objects, then control transitions to processing step 1366. During processing step 1366, object system 130 updates all visible windows to reflect the changes made in the diagram. Control then transitions to termination symbol 1368 and the drag and drop operation is completed.

Referring now to FIGS. 14A–14D, the operation of the cut, copy and paste of one or more objects from the diagram is shown. More specifically, during a cut operation, a user selects the cut command as shown at step 1402. After the cut command is selected, control transitions to decision step 1404. During decision step 1404, object system 130 determines whether all selected types are supported by the cut operation. If all of the selected types are not supported by the cut operation then control transitions to processing step 1406. During processing step 1406, object system 130 warns the user and asks whether the user wishes to continue. Control then. transitions to decision step 1408. During decision step 1408, object system 130 determines whether the user wishes to continue. If the user chooses not to continue, then control transitions to termination step 1409 and the cut operation is abandoned. If the user chooses to continue, or if all of the selected object types were supported by the cut operation as determined by decision step 1404, then control transitions to processing step 1410 (see FIG. 14B).

Figure 14A:
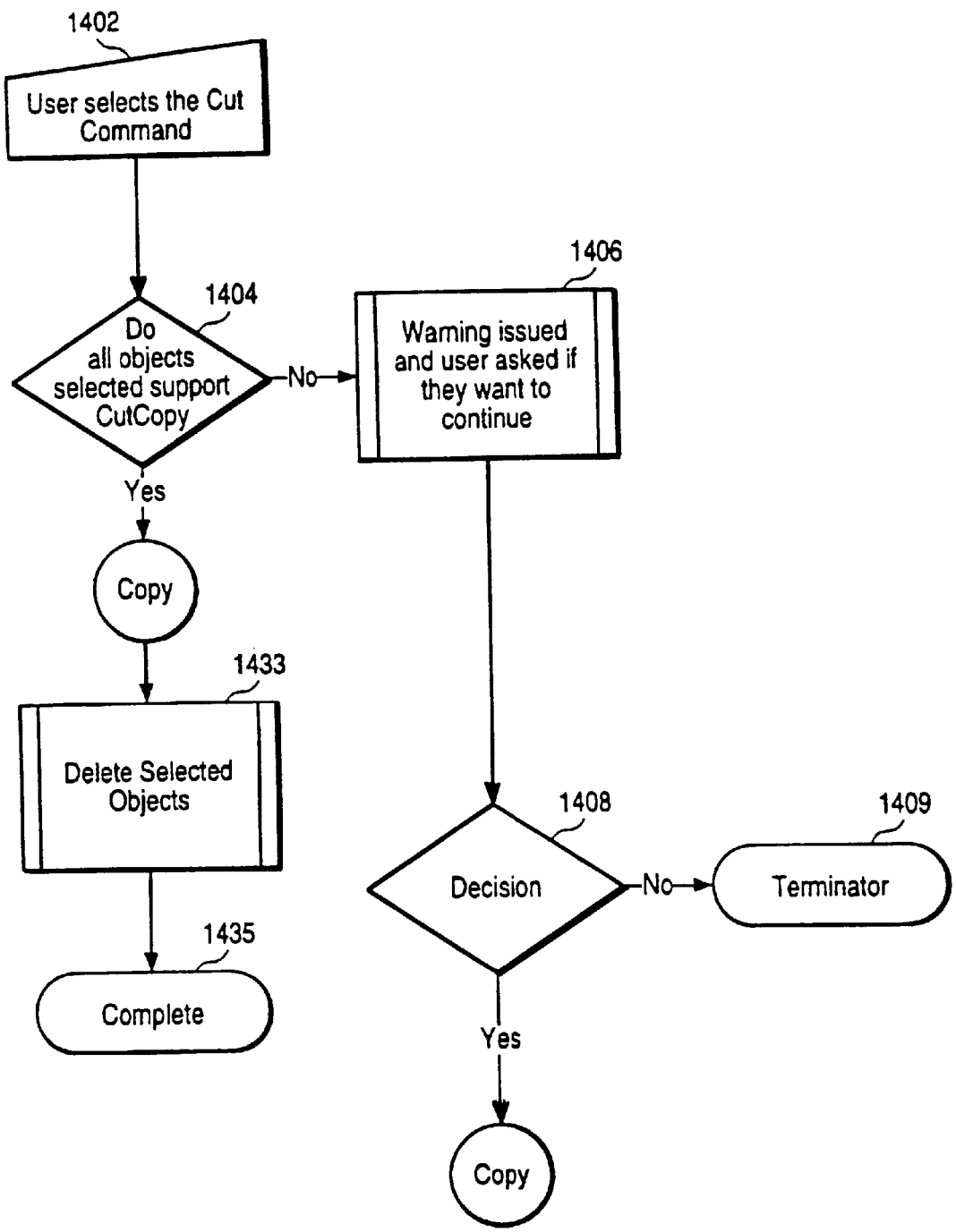
FIG. 14A–14D are flow charts showing native cut, copy and paste operations in a diagram portion of a control studio object system in accordance with the present invention.
Figure 14B:
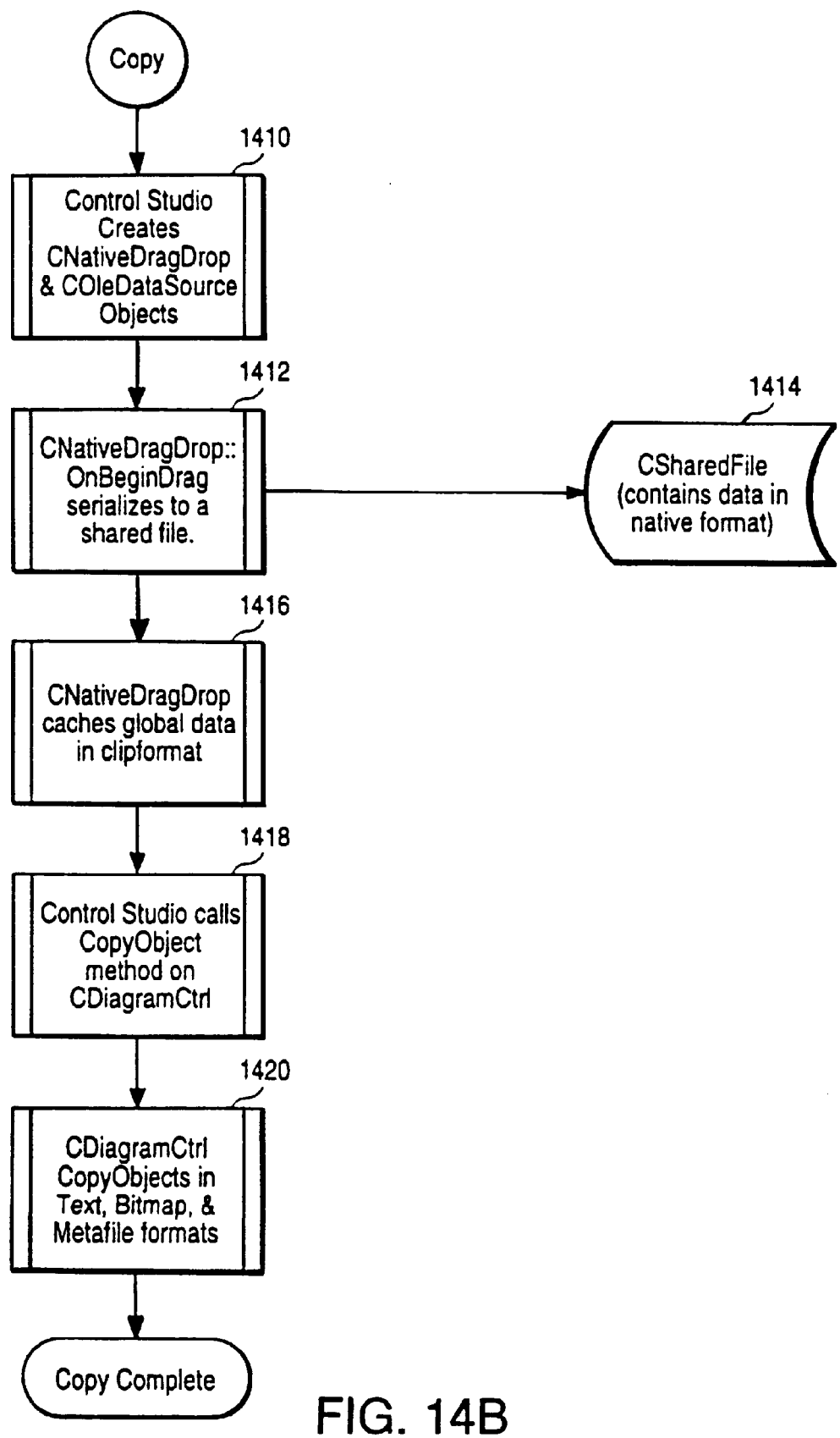

Referring to FIG. 14B, during processing step 1410 object system 130 creates CNativeDragDrop and COleDataSource objects and invokes the OnBeginDrag method of the CNativeDragDrop object. Control then transitions to processing step 1412, During processing step 1412, the OnBeginDrag method serializes the data of the selected objects to a shared file 1414. Control then transitions to processing step 1416. During processing step 1416, the OnBeginDrag method caches the data to the COleDataSource. Control then transitions to processing step 1418. During processing step 1418, the CopyObject method of CDiagramCtrl object is invoked. Control then transitions to processing step 1420. During processing step 1420, the method CopyObject copies the objects in various formats to the clipboard. On completion, object system 130 transitions to the calling function and the copy is complete. Control studio object system 130 then transitions to processing step 1433 which deletes all selected objects and transitions to completion step 1435 whereupon the cut is complete.

Figure 14C:
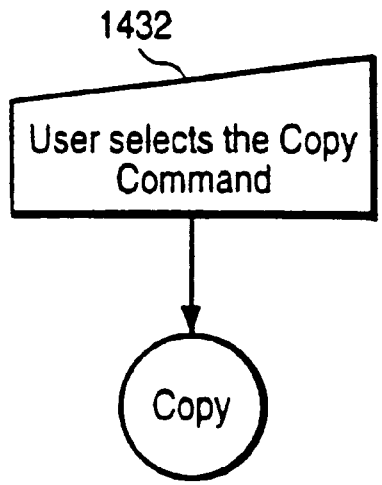

Referring to FIG. 14C, during a copy operation, a user selects the copy command as shown at step 1432. After the copy command is selected, control transitions to processing step 1410 which is described above (see FIG. 14B).

Figure 14D:
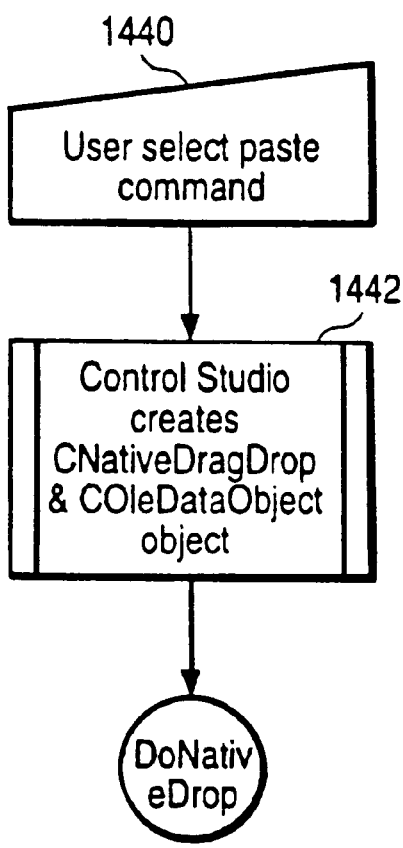

Referring to FIG. 14D, during a paste operation, a user selects the paste command as shown at step 1440. After the paste command is selected, control transitions to processing step 1442. During processing step 1442, object system 130 creates CNativeDragDrop and COleDataObject objects. Control then transitions to processing step 1446 (see FIG. 13C).

Figure 15:
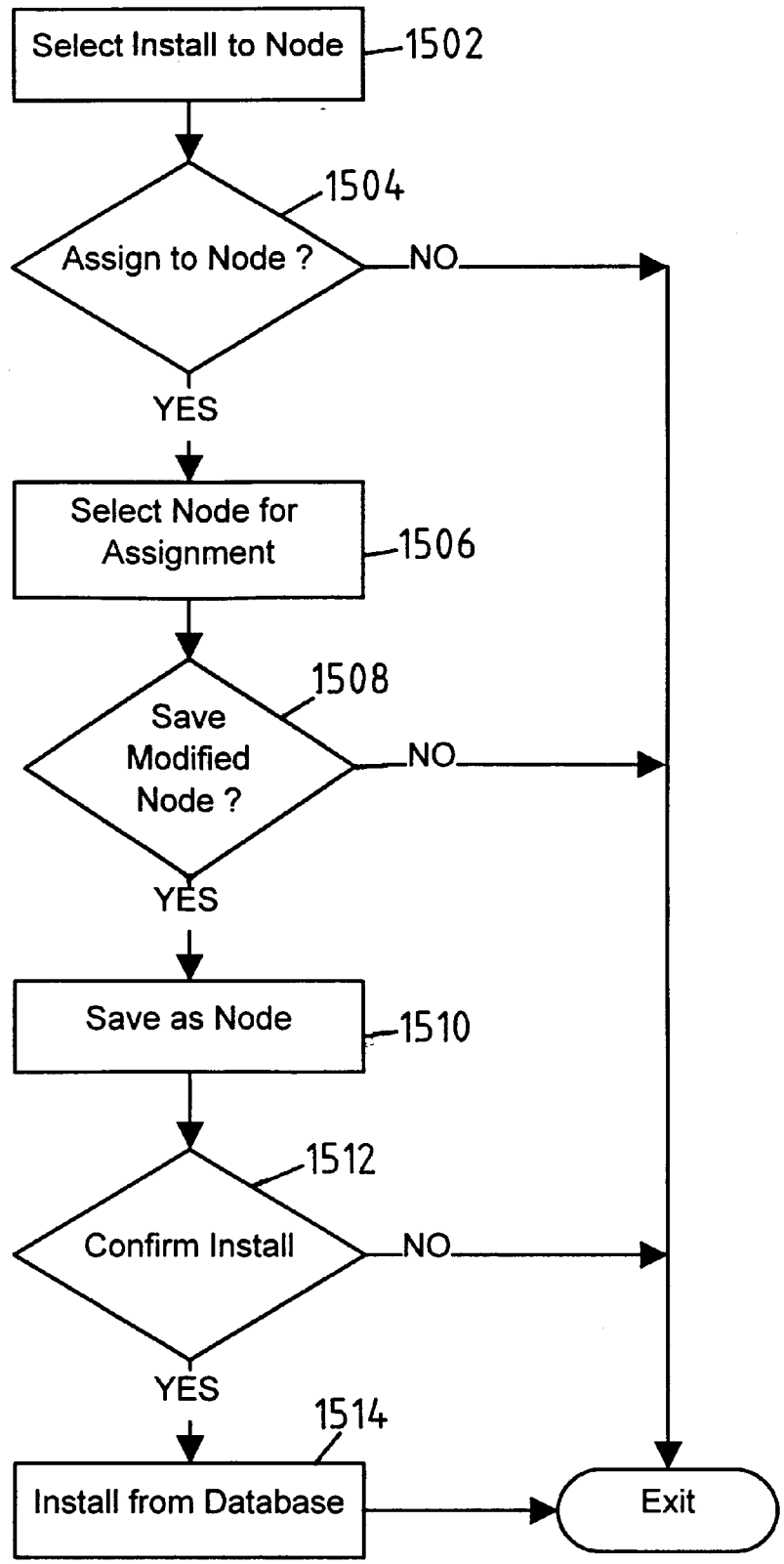
FIG. 15 is a flow chart showing the operation of installing a diagram to a node in accordance with the present invention.

Referring to FIG. 15, the operation of control studio object system 130 is shown. More specifically, when a user wishes to install a process control diagram to a node, the user selects the Install to Node item from the File menu. Based upon user input, object system 130 then determines whether to install the entire module or just the changes since the last install operation was performed. When the user selects install entire module and the module has not yet been assigned to a node 1502, object system 130 informs the user that the module has not been assigned to a node and asks whether the user wishes to install the module to a node 1504. Object system 130 the presents then user with a list of nodes from which the user may select the appropriate node for configuring 1506. After the user selects the node for configuring, object system 130 presents the user presents the user with a window confirming whether the user wishes to update the module 1508. Object system 130 then requests the user to name the module 1510. After the user selects or generates a name, object system 130 asks the user whether the user is sure that the user wishes to perform the install procedure 1512. By answering yes, the control studio object system 130 automatically performs the install operation by downloading the information stored within the database to the selected module 1514.

Other Embodiments

Other embodiments are within the following claims.

More specifically, while particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention, including but not limited to implementations in other programming languages. Additionally, while the preferred embodiment is disclosed as a software implementation, it will be appreciated that hardware implementations such as application specific integrated circuit implementations are also within the scope of the following claims.

What is claimed is:

1. A method for configuring a process control environment, the process control environment including a computer system having a processor coupled to a display device and a separate controller coupled to a plurality of field devices, the method comprising:

providing an object oriented framework, the object oriented framework including classes, the classes including classes from a set of commercially available foundation classes and classes derived from the set of commercially available foundation classes;

presenting, on the display device, a stencil portion presentation including a stencil object, the stencil object representing a process control element including a step of using at least one stencil class that is derived from the set of commercially available foundation classes;

presenting, on the display device, a diagram portion presentation, the diagram portion presentation representing a process control environment configuration, including the step of using at least one diagram class that is derived from the set of commercially available foundation classes;

dragging the stencil object from the stencil portion presentation to the diagram portion presentation;

dropping the stencil object on the diagram portion presentation in a position indicative of a location of the process control element in the process control environment to create a process control routine; and configuring the controller within the process control environment to operate in accordance with the diagram portion presentation to execute at least a portion of the process control routine during runtime of a process.

2. The method of claim 1 wherein the at least one stencil class includes a stencil class for maintaining a list for stencil control and managing a stencil user interface.

3. The method of claim 1 wherein the at least one diagram class includes a diagram class for managing a diagram user interface.

4. The method of claim 1 wherein the at least one stencil class and the at least one diagram class descend from a form view foundation class, the form view foundation class being for containing control classes.

5. The method of claim 1 wherein the classes from the set of commercially available foundation classes include a list view control foundation class and a image list foundation class.

6. The method of claim 5 wherein the at least one stencil class includes a stencil list control class, the stencil list control class managing stencil items, providing a view of the stencil items and providing a drag source capability.

7. The method of claim 6 wherein the at least one stencil class further includes a function block stencil view class, the function block stencil view class controlling stencils used for creating a function block diagram.

8. The method of claim 6 wherein the at least one stencil class further includes a sequential function charting (SFC) stencil view class, the SFC stencil view class controlling stencils used for creating an SFC diagram.

9. A method for configuring a process control environment, the process control environment including a computer system having a processor coupled to a display device and a controller coupled to a plurality of field devices, the method comprising the steps of:

providing an object oriented framework, the object oriented framework including classes, the classes including classes from a set of commercially available foundations classes and classes derived from the set of commercially available foundation classes;

presenting a stencil portion presentation, the stencil portion presentation including a plurality of stencil objects representing respective process control elements, the steps of presenting a stencil portion presentation including the step of using at least one stencil class that is derived from the set of commercially available foundation classes;

presenting a diagram portion presentation on the display device, the diagram portion presentation representing a process control environment configuration when the process control environment is generated, including the step of using at least one diagram class that is derived from the set of commercially available foundation classes;

individually dragging a plurality of stencil objects from the stencil portion presentation to the diagram portion presentation;

dropping the plurality of stencil objects on the diagram portion presentation in positions indicative of locations of the respective process control elements in the process control environment;

interconnecting the plurality of stencil objects in the diagram portion presentation to indicate interaction of the respective process control elements in the process control environment, the interconnecting the plurality of stencil objects including using at least one connection class that is derived from the set of commercially available foundation classes; and configuring the controller within the process control environment to operate in accordance with the diagram portion presentation to execute at least a portion of the process control routine during runtime of a process.

10. The method of claim 9 wherein the at least one stencil class includes a stencil class for maintaining a list for stencil control and managing a stencil user interface.

11. The method of claim 9 wherein the at least one diagram class includes a diagram class for managing a diagram user interface.

12. The method of claim 9 wherein the at least one stencil class and the at least one diagram class descend from a form view foundation class, the form view foundation class being for containing control classes.

13. The method of claim 9 wherein the classes from the set of commercially available foundation classes include a list view control foundation class and a image list foundation class.

14. The method of claim 13 wherein the at least one stencil class includes a stencil list control class, the stencil list control class managing stencil items, providing a view of the stencil items and providing a drag source capability.

15. The method of claim 14 wherein the at least one stencil class further includes a function block stencil view class, the function block stencil view class controlling stencils used for creating a function block diagram.

16. The method of claim 14 wherein the at least one stencil class further includes a sequential function charting (SFC) stencil view class, the SFC stencil view class controlling stencils used for creating an SFC diagram.

17. The method of claim 9 wherein the at least one connection class includes a connection base class, the connection base class representing a connection object.

18. The method of claim 17 wherein the at least one connection class further includes a sequence function chart (SFC) connection class, the SFC connection class providing a representation of a connection on an SFC object.

19. The method of claim 18 wherein the at least one connection class further includes a function block connection class, the function block connection class providing a representation of a connection on a function block object.

20. A system for configuring a process control environment comprising:

a computer system including a processor coupled to a memory, a display device and a separate controller coupled to a plurality of field devices;

an object oriented framework stored on the memory, the object oriented framework including classes, the classes including classes from a set of commercially available foundation classes and classes derived from the set of commercially available foundation classes;

a first software portion that presents, on the display device, a stencil portion presentation including a stencil object, the stencil object representing a process control element, the first software portion including at least one stencil class that is derived from the set of commercially available foundation classes;

a second software portion that presents, on the display device, a diagram portion presentation, the diagram portion presentation representing a process control environment configuration, the second software portion including at least one diagram class that is derived from the set of commercially available foundation classes;

a third software portion that enables a user to drag the stencil object from the stencil portion presentation to the diagram portion presentation;

a fourth software portion that enables the user to drop the stencil object on the diagram portion presentation in a position indicative of a location of the process control element in the process control environment to create a process control routine; and a fifth software portion that configures the controller within the process control environment to operate in accordance with the diagram portion presentation to execute at least a portion of the process control routine during runtime of a process.

21. The system of claim 20 wherein the at least one stencil class includes a stencil class for maintaining a list for stencil control and managing a stencil user interface.

22. The system of claim 20 wherein the at least one diagram class includes a diagram class for managing a diagram user interface.

23. The system of claim 20 wherein the at least one stencil class and the at least one diagram class descend from a form view foundation class, the form view foundation class being for containing control classes.

24. The system of claim 20 wherein the classes from the set of commercially available foundation classes include a list view control foundation class and a image list foundation class.

25. The system of claim 24 wherein the at least one stencil class includes a stencil list control class, the stencil list control class managing stencil items, providing a view of the stencil items and providing a drag source capability.

26. The system of claim 25 wherein the at least one stencil class further includes a function block stencil view class, the function block stencil view class controlling stencils used for creating a function block diagram.

27. The system of claim 25 wherein the at least one stencil class further includes a sequential function charting (SFC) stencil view class, the SFC stencil view class controlling stencils used for creating an SFC diagram.

28. A system for configuring a process control environment comprising:

a computer system including a processor coupled to a memory, a display device and a separate controller coupled to a plurality of field devices;

an object oriented framework, the object oriented framework including classes, the classes including classes from a set of commercially available foundations classes and classes derived from the set of commercially available foundation classes;

a first software portion that presents a stencil portion presentation, the stencil portion presentation including a plurality of stencil objects representing respective process control elements, the first software portion including at least one stencil class that is derived from the set of commercially available foundation classes;

a second software portion that presents a diagram portion presentation on the display device, the diagram portion presentation representing a process control environment configuration when the process control environment is generated, the second software portion including at least one diagram class that is derived from the set of commercially available foundation classes;

a third software portion that enables a user to drag the plurality of stencil objects from the stencil portion presentation to the diagram portion presentation;

a fourth software portion that enables a user to drop the plurality of stencil objects on the diagram portion presentation in positions indicative of locations of the respective process control elements in the process control environment;

a fifth software portion that interconnects the plurality of stencil objects in the diagram portion presentation to indicate interaction of the respective process control elements in the process control environment to create a process control routine, the fifth software portion including at least one connection class that is derived from the set of commercially available foundation classes; and a sixth software that configures the controllers within the process control environment to operate in accordance with the diagram portion presentation to execute at least a portion of the process control routine during runtime of a process.

29. The system of claim 28 wherein the at least one stencil class includes a stencil class for maintaining a list for stencil control and managing a stencil user interface.

30. The system of claim 28 wherein the at least one diagram class includes a diagram class for managing a diagram user interface.

31. The system of claim 28 wherein the at least one stencil class and the at least one diagram class descend from a form view foundation class, the form view foundation class being for containing control classes.

32. The system of claim 28 wherein the classes from the set of commercially available foundation classes include a list view control foundation class and a image list foundation class.

33. The system of claim 32 wherein the at least one stencil class includes a stencil list control class, the stencil list control class managing stencil items, providing a view of the stencil items and providing a drag source capability.

34. The system of claim 33 wherein the at least one stencil class further includes a function block stencil view class, the function block stencil view class controlling stencils used for creating a function block diagram.

35. The system of claim 33 wherein the at least one stencil class further includes a sequential function charting (SFC) stencil view class, the SFC stencil view class controlling stencils used for creating an SFC diagram.

36. The system of claim 28 wherein
the at least one connection class includes a connection base class, the connection base class representing a connection object.

37. The system of claim 36 wherein
the at least one connection class further includes a sequence function chart (SFC) connection class, the SFC connection class providing a representation of a connection on an SFC object.

38. The method of claim 36 wherein
the at least one connection class further includes a function block connection class, the function block connection class providing a representation of a connection on a function block object.

39. A system for generating a new process control environment comprising:
   a computer system having a processor coupled to a display device and a controller coupled to a plurality of field devices;
   a first software portion that presents a stencil portion presentation, the stencil portion presentation including a plurality of stencil objects representing respective process control elements;
   a second software portion that presents a diagram portion presentation on the display device, the diagram portion presentation representing a process control environment configuration when the process control environment is generated;
   a user interface, operatively coupled to the display device, to control dragging of one or more of the plurality of stencil objects from the stencil portion presentation to the diagram portion presentation and to control dropping of the stencil objects on the diagram portion presentation in positions indicative of a location of the respective process control element in the process control environment to create a process control routine; and
   a third software portion that interconnects dropped stencil objects to operate in accordance with the diagram portion presentation, to execute at least a portion of the process control routine during runtime of a process and to provide the new process control environment.

40. A method for configuring a process control environment, the process control environment including a computer system having a processor coupled to a display device and a controller coupled to a plurality of field devices, the method comprising the steps of:
   presenting, on the display device, a stencil portion presentation including an object;
   presenting, on the display device, a diagram portion presentation, the diagram portion presentation representing a process control environment configuration;
   dragging the object from the stencil portion presentation to the diagram portion presentation;
   dropping the object on the diagram portion presentation in a position indicative of a location of an element in the process control environment to create a process control routine; and
   configuring the controller within the process control environment to operate in accordance with the diagram portion presentation to execute at least a portion of the process control routine during runtime of a process.

41. The method of claim 40 wherein the step of dragging the object from the stencil portion presentation to the diagram portion presentation includes the step of selecting the object.

42. The method of claim 40 wherein the steps of configuring a process control environment are implemented using an object oriented framework.

43. The method of claim 42 wherein the object oriented framework includes classes and the classes are derived from or included with a set of commercially available foundation classes.

44. The method of claim 40 wherein the object is a stencil object.

45. The method of claim 40 wherein the element is a process control module.

46. The method of claim 40 wherein the object represents a process control module.

47. A system for configuring a process control environment having a computer system with a processor coupled to a display device and a separate controller coupled to a plurality of field devices, the system including;
   a first software portion adapted to present a stencil portion presentation, the stencil portion presentation including an object;
   a second software portion adapted to present a diagram portion presentation on the display device, the diagram portion presentation representing a process control environment configuration;
   a user interface, operatively coupled to the display device, to control dragging of the object from the stencil portion presentation to the diagram portion presentation and to control dropping of the object on the diagram portion presentation in a position indicative of a location of a process control element in the process control environment to create a process control routine; and
   a configuration routine adapted to configure the controller within the process control environment to operate in accordance with the diagram portion presentation to execute at least a portion of the process control routine during runtime of a process.

48. The system of claim 47 further comprising:
   a third software portion adapted to present a cursor on the display device, movement of the cursor being controlled by the user interface, the user interface allowing a user to control the cursor to select the object in the stencil portion presentation and to drag the object from the stencil portion presentation to a position in the diagram portion presentation indicative of a location of the process control element in the process control environment.

49. The system of claim 48 wherein the object is a process control module.

50. The system of claim 49 wherein the object is a stencil object.

51. The system of claim 49 wherein the object represents a module.

52. The system of claim 48 wherein the third software portion is implemented using an object oriented framework.

53. The system of claim 47 wherein the second software portion is implemented using an object oriented framework.

54. The system of claim 53 wherein the object oriented framework includes classes and the second software portion includes classes derived from or included with a set of commercially available foundation classes.

55. The system of claim 47 wherein the first software portion is implemented using an object oriented framework.

56. The system of claim 53 wherein the object oriented framework includes classes and the first software portion includes classes derived from or included with a set of commercially available foundation classes.

57. The system of claim 55 wherein the object oriented framework includes classes and the first software portion includes classes derived from or included with a set of commercially available foundation classes.

58. A system for generating a new process control environment comprising:
- a computer system having a processor coupled to a display device and a separate controller coupled to a plurality of field devices;
- a first software portion adapted to present a stencil portion presentation, the stencil portion presentation including a plurality of objects;
- a second software portion adapted to present a diagram portion presentation on the display device, the diagram portion presentation representing a process control environment configuration when the process control environment is generated;
- a user interface operatively coupled to the display device to control dragging of one or more of the plurality of objects from the stencil portion presentation to the diagram portion presentation and to control a step of dropping of the objects on the diagram portion presentation in positions indicative of a location of a respective element in the process control environment; and
- a third software portion adapted to interconnect the dropped stencil objects to operate in accordance with the diagram portion presentation to execute at least a portion of a process control routine during runtime of a process; and
- a configuration routine adapted to configure the controller within the process control environment to operate in accordance with the diagram portion presentation to execute at least a portion of the process control routine during runtime of a process.

59. The system of claim 58 further comprising:
- a fourth software portion adapted to present a cursor on the display device, movement of the cursor being controlled by the user interface, the user interface allowing a user to control the cursor to select the object in the stencil portion presentation and to drag the object from the stencil portion presentation to a position in the diagram portion presentation indicative of a location of the element in the process control environment to create the process control routine.

60. The system of claim 58 wherein the element is a process control module.

61. The system of claim 58 wherein the object is a stencil object.

62. The system of claim 58 wherein the object represents the module.

63. The system of claim 59 wherein the fourth software portion is adapted to use an object-oriented framework including classes, and includes classes derived from or included with a set of commercially available foundation classes.

64. The system of claim 59 wherein the third software portion is adapted to use an object-oriented framework including classes, and includes classes derived from or included with a set of commercially available foundation classes.

65. The system of claim 59 wherein the second software portion is implemented using an object oriented framework.

66. The system of claim 65 wherein the object oriented framework includes classes and the second software portion includes classes derived from or included with a set of commercially available foundation classes.

67. The system of claim 59 wherein the first software portion is implemented using an object oriented framework.

68. The system of claim 67 wherein the object oriented framework includes classes and the first software portion includes classes derived from or included with a set of commercially available foundation classes.

* * * * *